United States Patent
Ma et al.

(10) Patent No.: US 9,946,703 B2
(45) Date of Patent: Apr. 17, 2018

(54) TITLE EXTRACTION USING NATURAL LANGUAGE PROCESSING

(71) Applicant: Microsoft Technology Licensing, LLC, Redmond, WA (US)

(72) Inventors: Weiqin Ma, San Jose, CA (US); Bin Wu, Palo Alto, CA (US); Wenxuan Gao, Santa Clara, CA (US); Weidong Zhang, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/240,965

(22) Filed: Aug. 18, 2016

(65) Prior Publication Data

US 2018/0052816 A1 Feb. 22, 2018

(51) Int. Cl.
*G06F 17/00* (2006.01)
*G06F 17/25* (2006.01)
*G06F 17/27* (2006.01)

(52) U.S. Cl.
CPC ........... *G06F 17/25* (2013.01); *G06F 17/274* (2013.01); *G06F 17/2785* (2013.01)

(58) Field of Classification Search
CPC ............ G06F 17/277; G06F 17/30666; G06F 17/30719
USPC .............................................................. 704/9
See application file for complete search history.

(56) References Cited

U.S. PATENT DOCUMENTS

| 2004/0225667 A1* | 11/2004 | Hu | G06F 17/30719 |
| 2012/0143595 A1* | 6/2012 | Li | G06F 17/30719 704/9 |

* cited by examiner

*Primary Examiner* — Daniel Abebe
(74) *Attorney, Agent, or Firm* — Schwegman Lundberg & Woessner, P.A.

(57) ABSTRACT

Methods, systems, and computer programs are presented for selecting a title for a post of a social network. A method includes operations for identifying a word weight for each word in a corpus based on the relevance of each word, receiving a document that includes several sentences, and assigning to each word in the sentences a tag indicative of a part of speech. Further, the method includes operations for calculating a topic weight for each sentence based on the tags of the words in the sentence, and for calculating a sentence weight for each sentence based on a sum of the word weights of the words in the sentence, the topic weight for the sentence, and a position weight of the sentence within a paragraph. The sentence with the highest sentence weight is selected as the title for the document, and the title is presented with the document to a user.

17 Claims, 13 Drawing Sheets

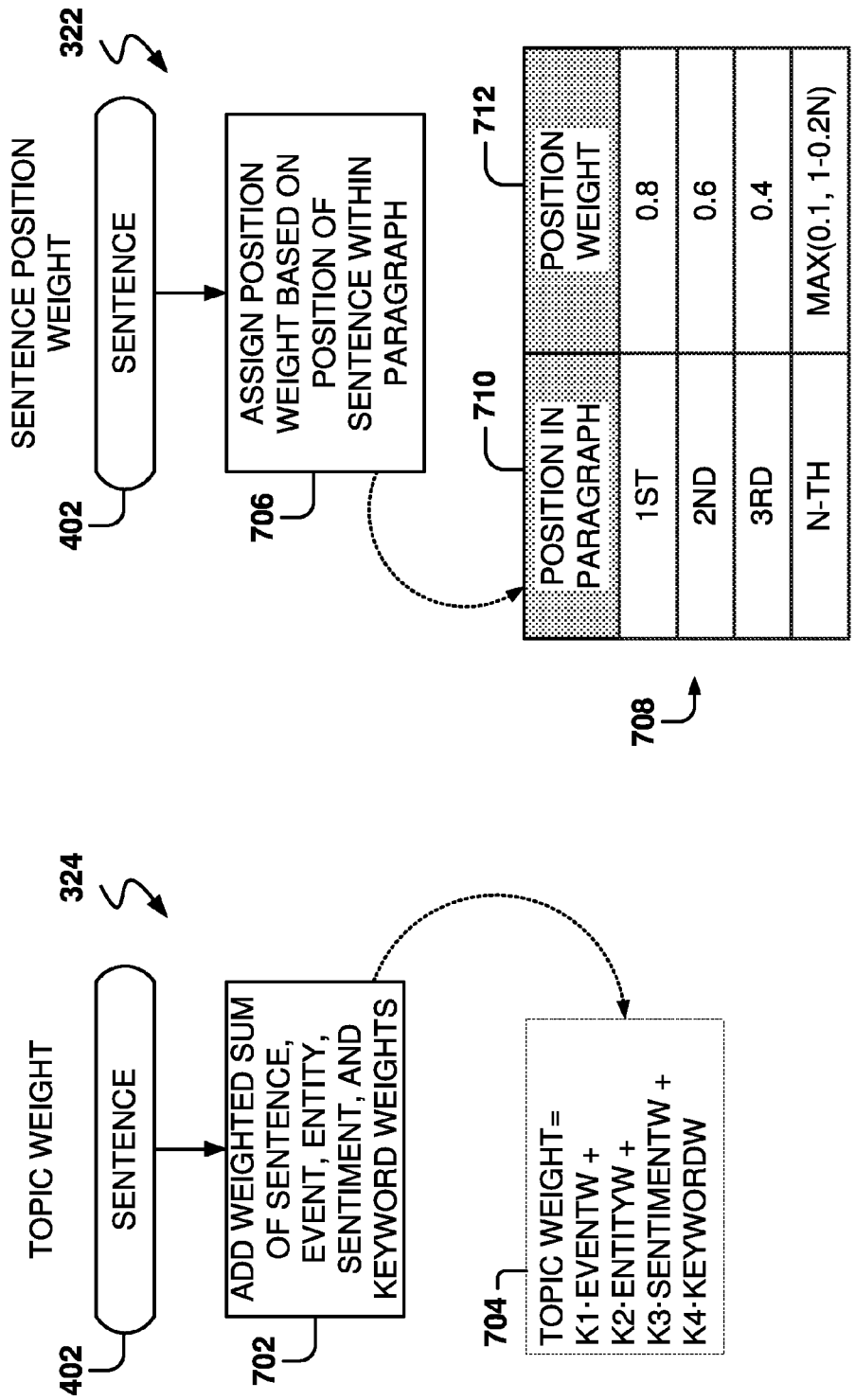

TITLE EXTRACTION USING NATURAL LANGUAGE PROCESSING

TECHNICAL FIELD

The subject matter disclosed herein generally relates to methods, systems, and programs for characterizing a document and, more particularly, methods, systems, and computer programs for selecting a title for a post of a social network.

BACKGROUND

Social networks generate a large number of posts, also referred to herein as documents, every day, and sorting out the posts is important so as to present the most relevant content for each user. A key part of sorting posts includes determining what the post is about. Having a good title for the post is a great help in determining the subject of the content and how to sort and classify the post.

Some approaches for determining the title of a document rely on the document format or metadata fields. However, these methods do not work well for popular social media networks, such as Twitter®'s tweets and Facebook®'s posts, which do not have rich format or metadata information and often include noisy information unrelated to the real subject of the document.

BRIEF DESCRIPTION OF THE DRAWINGS

Various ones of the appended drawings merely illustrate example embodiments of the present disclosure and cannot be considered as limiting its scope.

FIG. 7A is flowchart of a method, according to some example embodiments, for calculating a topic weight.

FIG. 7B is flowchart of a method, according to some example embodiments, for calculating a sentence position weight.

DETAILED DESCRIPTION

Figure 1:
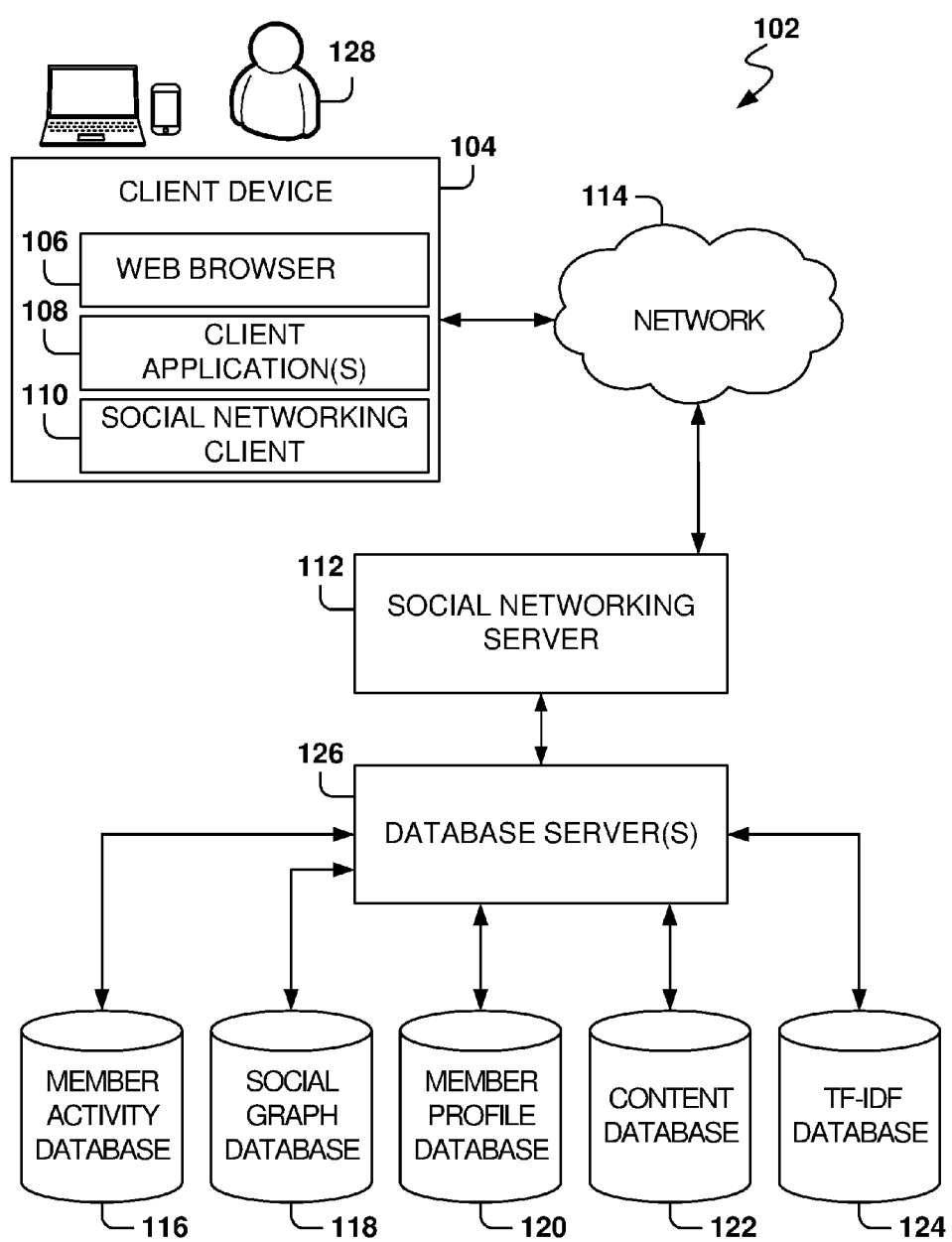
FIG. 1 is a block diagram illustrating a networked system, according to some example embodiments, including a social networking server.

Example methods, systems, and computer programs are directed to selecting a title for a post of a social network. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Embodiments presented herein utilize a new approach for selecting titles based on term frequency-inverse document frequency (TF-IDF) and based on natural-language processing techniques. Test results show better quality of the identified titles compared to previous solutions, especially in the presence of noise in the documents.

The text of the document is cleaned and then broken into sentences. Each sentence is analyzed to identify a part-of-speech (POS) for each word in the sentence. The POS of the words is used to identify several features, where each feature provides a score, and the features' scores are combined to identify the sentence score, which is then used to rank the sentences and select the best sentence as the title.

Having a good title also helps in the processing of posts of the social network, because repeated posts, or very similar posts, may be grouped together when the posts have the same title. For example, there can be many retweets referring to the same item, and all the retweets are grouped because they have the same title. This allows the user's feed to include less duplicates. Having a better title also helps users because it provides better information when the user is browsing through the social posts and looks at titles to decide about reading or ignoring each post.

One general aspect includes a method including operations for identifying a word weight for each word in a corpus based on a relevance of each word, receiving a document that includes a plurality of sentences, and for assigning to each word in the plurality of sentences a tag indicative of a part of speech of the word. The method also includes calculating a topic weight for each sentence based on the tags of the words in the sentence, and calculating a sentence weight for each sentence based on a sum of the word weights of the words in the sentence, the topic weight for the sentence, and a position of the sentence within a paragraph. The method also includes selecting the sentence with a highest sentence weight as a title for the document, and causing the title to be presented with the document to a user.

One general aspect includes a system including a memory having instructions and one or more computer processors, where the instructions, when executed by the one or more computer processors, cause the one or more computer processors to perform operations, which include identifying a word weight for each word in a corpus based on a relevance of each word, receiving a document that includes a plurality of sentences, and assigning to each word in the plurality of sentences a tag indicative of a part of speech of the word. The operations further include calculating a topic weight for each sentence based on the tags of the words in the sentence, and calculating a sentence weight for each sentence based on a sum of the word weights of the words in the sentence, the topic weight for the sentence, and a position weight of the sentence within a paragraph. The operations also include selecting the sentence with a highest sentence weight as a title for the document and causing the title to be presented with the document to a user.

Another general aspect includes a non-transitory machine-readable storage medium including instructions that, when executed by a machine, cause the machine to perform operations, which include identifying a word weight for each word in a corpus based on a relevance of each word, receiving a document that includes a plurality of sentences, and assigning to each word in the plurality of sentences a tag indicative of a part of speech of the word. The operations further include calculating a topic weight for each sentence based on the tags of the words in the sentence, and calculating a sentence weight for each sentence based on a sum of the word weights of the words in the sentence, the topic weight for the sentence, and a position weight of the sentence within a paragraph. The operations also includes selecting the sentence with a highest sentence weight as a title for the document, and causing the title to be presented with the document to a user.

FIG. 1 is a block diagram illustrating a networked system, according to some example embodiments, including a social networking server 112, illustrating an example embodiment of a high-level client-server-based network architecture 102. The social networking server 112 provides server-side functionality via a network 114 (e.g., the Internet or a wide area network (WAN)) to one or more client devices 104. FIG. 1 illustrates, for example, a web browser 106 (e.g., the Internet Explorer® browser developed by Microsoft® Corporation), client application(s) 108, and a social networking client 110 executing on a client device 104. The social networking server 112 is further communicatively coupled with one or more database servers 126 that provide access to one or more databases 116-124.

The client device 104 may comprise, but is not limited to, a mobile phone, a desktop computer, a laptop, a portable digital assistant (PDA), a smart phone, a tablet, an ultrabook, a netbook, a multi-processor system, a microprocessor-based or programmable consumer electronic system, or any other communication device that a user 128 may utilize to access the social networking server 112. In some embodiments, the client device 104 may comprise a display module (not shown) to display information (e.g., in the form of user interfaces). In further embodiments, the client device 104 may comprise one or more of touch screens, accelerometers, gyroscopes, cameras, microphones, global positioning system (GPS) devices, and so forth.

In one embodiment, the social networking server 112 is a network-based appliance that responds to initialization requests or search queries from the client device 104. One or more users 128 may be a person, a machine, or other means of interacting with the client device 104. In various embodiments, the user 128 is not part of the network architecture 102, but may interact with the network architecture 102 via the client device 104 or another means. For example, one or more portions of the network 114 may be an ad hoc network, an intranet, an extranet, a virtual private network (VPN), a local area network (LAN), a wireless LAN (WLAN), a WAN, a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

The client device 104 may include one or more applications (also referred to as "apps") such as, but not limited to, the web browser 106, the social networking client 110, and other client applications 108, such as a messaging application, an electronic mail (email) application, a news application, and the like. In some embodiments, if the social networking client 110 is present in the client device 104, then the social networking client 110 is configured to locally provide the user interface for the application and to communicate with the social networking server 112, on an as-needed basis, for data and/or processing capabilities not locally available (e.g., to access to member profile, to authenticate a user 128, to identify or locate other connected members, etc.). Conversely, if the social networking client 110 is not included in the client device 104, the client device 104 may use the web browser 106 to access the social networking server 112.

Further, while the client-server-based network architecture 102 is described with reference to a client-server architecture, the present subject matter is of course not limited to such an architecture, and could equally well find application in a distributed, or peer-to-peer, architecture system, for example.

In addition to the client device 104, the social networking server 112 communicates with the one or more database server(s) 126 and database(s) 116-124. In one example embodiment, the social networking server 112 is communicatively coupled to a member activity database 116, a social graph database 118, a member profile database 120, a content database 122, and a TF-IDF database 124. The databases 116-124 may be implemented as one or more types of databases including, but not limited to, a hierarchical database, a relational database, an object-oriented database, one or more flat files, a NoSQL data store, or combinations thereof.

The member profile database 120 stores member profile information about members who have registered with the social networking server 112. With regard to the member profile database 120, the member may include an individual person or an organization, such as a company, a corporation, a nonprofit organization, an educational institution, or other such organizations.

Consistent with some example embodiments, when a user initially registers to become a member of the social networking service provided by the social networking server 112, the user is prompted to provide some personal information, such as name, age (e.g., birth date), gender, interests, contact information, home town, address, spouse's and/or family members' names, educational background (e.g., schools, majors, matriculation and/or graduation dates, etc.), employment history, professional industry, skills, professional organizations, and so on. This information is stored, for example, in the member profile database 120. Similarly, when a representative of an organization initially registers the organization with the social networking service provided by the social networking server 112, the representative may be prompted to provide certain information about the organization. This information may be stored, for example, in the member profile database 120. In some embodiments, the profile data may be processed (e.g., in the background or offline) to generate various derived profile data. For example, if a member has provided information about various job titles that the member has held with the same company or different companies, and for how long, this information can be used to infer or derive a member profile attribute indicating the member's overall seniority level, or seniority level within a particular company. In some example embodiments, importing or otherwise accessing data from one or more externally hosted data sources may enhance profile data for both members and organizations. For instance, with companies in particular, financial data may be imported from one or more external data sources, and made part of a company's profile.

As users interact with the social networking service provided by the social networking server 112, the social networking server 112 is configured to monitor these interactions. Examples of interactions include, but are not limited to, commenting on posts entered by other members, viewing member profiles, editing or viewing a member's own profile, sharing content outside of the social networking service (e.g., an article provided by an entity other than the social networking server 112), updating a current status, posting content for other members to view and comment on, and other such interactions. In one embodiment, records of these interactions are stored in the member activity database 116, which associates interactions made by a member with his or her member profile stored in the member profile database 120. In one example embodiment, the member activity database 116 includes the posts created by the users of the social networking service for presentation on user feeds.

The content database 122 stores posts or documents that have been created or referenced by users of the system. The content may vary from small text messages to large documents with multiple pages, or even collections of documents with reference to external data (e.g., databases, articles, webpages). Embodiments presented herein describe the selection of a title for one or more of the documents in content database 122.

The TF-IDF database 124 stores TF-IDF scores for the word in a corpus, which may be encompass all or part of the English language (and/or other languages) words. For example, the corpus may include all the words in an English dictionary or in an English Thesaurus. The TF-IDF scores are based on the frequency of occurrence of the words within the corpus.

In one embodiment, the social networking server 112 communicates with the various databases 116-124 through the one or more database server(s) 126. In this regard, the database server(s) 126 provide one or more interfaces and/or services for providing content to, modifying content in, removing content from, or otherwise interacting with the databases 116-124. For example, and without limitation, such interfaces and/or services may include one or more Application Programming Interfaces (APIs), one or more services provided via a Service-Oriented Architecture (SOA), one or more services provided via a REST-Oriented Architecture (ROA), or combinations thereof. In an alternative embodiment, the social networking server 112 communicates with the databases 116-124 and includes a database client, engine, and/or module, for providing data to, modifying data stored within, and/or retrieving data from the one or more databases 116-124.

While the database server(s) 126 is illustrated as a single block, one of ordinary skill in the art will recognize that the database server(s) 126 may include one or more such servers. For example, the database server(s) 126 may include, but are not limited to, a MySQL database server, a Microsoft® SQL Server, a NoSQL data server, or any other server configured to provide access to one or more of the databases 116-124, or combinations thereof. Accordingly, and in one embodiment, the database server(s) 126 implemented by the social networking service are further configured to communicate with the social networking server 112.

Figure 2:
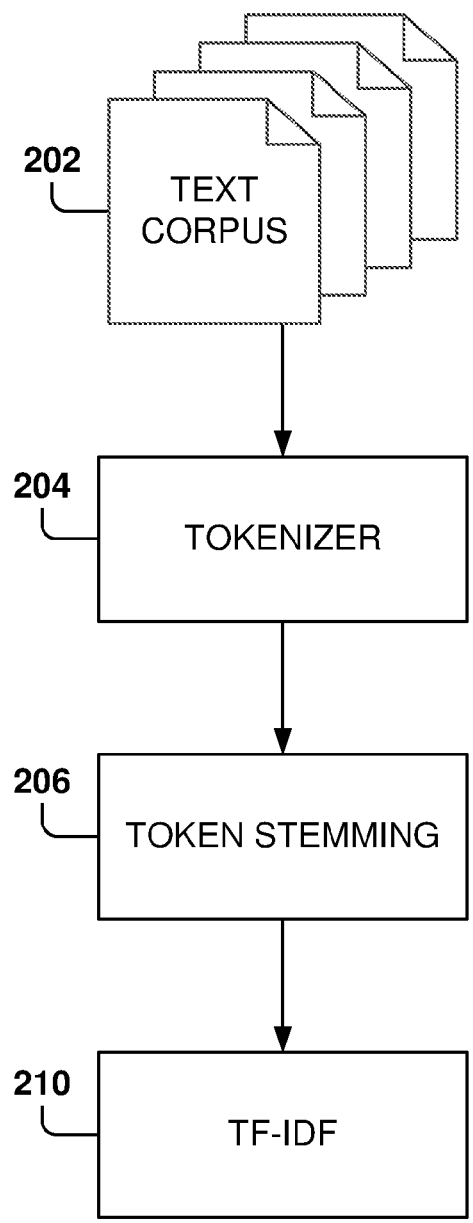
FIG. 2 is flowchart of a method, according to some example embodiments, for calculating term frequency-inverse document frequency (TF-IDF) scores.

FIG. 2 is flowchart of a method 212, according to some example embodiments, for calculating TD-IDF scores. At operation 204, a text corpus 202, which includes a plurality of documents, is analyzed in order to tokenize the words in the text corpus 202. Tokenization is the process of demarcating and possibly classifying sections of a string of input characters. In this case, each document in the text corpus 202 is tokenized to separate all the words in order to create a list of words that may be analyzed for calculating the TF-IDF.

After the tokenization operation 204, the method flows to operation 206 for stemming the tokens, and, optionally, lemmatization. Documents may include different forms of a word, such as "organize," "organizes," and "organizing." Additionally, there are families of derivationally related words with similar meanings, such as "democracy," "democratic," and "democratization."

In one example embodiment, common stop words are removed. Stop words are the most common words in English, and the number of stop words may vary from a few dozens to several hundreds. Any group of words can be chosen as the stop words. Some of the most common stop words include "the," "is," "at," "which," and "on."

In one example embodiment, the stop words include the following: "a," "about," "above," "across," "after," "afterwards," "again," "against," "all," "almost," "alone," "along," "already," "also," "although," "always," "am," "among," "amongst," "amoungst," "amount," "an," "and," "another," "any," "anyhow," "anyone," "anything," "anyway," "anywhere," "are," "around," "as," "at," "back," "be," "became," "because," "become," "becomes," "becoming," "been," "before," "beforehand," "behind," "being," "below," "beside," "besides," "between," "beyond," "bill," "both," "bottom," "but," "by," "call," "can," "cannot," "cant," "co," "con," "could," "couldnt," "cry," "de," "describe," "detail," "do," "done," "down," "due," "during," "each," "eg," "eight," "either," "eleven," "else," "elsewhere," "empty," "enough," "etc," "even," "ever," "every," "everyone," "everything," "everywhere," "except," "few," "fifteen," "fifty," "fill," "find," "fire," "first," "five," "for," "former," "formerly," "forty," "found," "four," "from," "front," "full," "further," "get," "give," "go," "had," "has," "hasnt," "have," "he," "hence," "her," "here," "hereafter," "hereby," "herein," "hereupon," "hers," "herself," "him," "himself," "his," "how," "however," "hundred," "i," "ie," "if," "in," "inc," "indeed," "interest," "into," "is," "it," "its," "itself," "keep," "last," "latter," "latterly," "least," "less," "ltd," "made," "many," "may," "me," "meanwhile," "might," "mill," "mine," "more," "moreover," "most," "mostly," "move," "much," "must," "my," "myself," "name," "namely," "neither," "never," "nevertheless," "next," "nine," "no," "nobody," "none," "noone," "nor," "not," "nothing," "now," "nowhere," "of," "off," "often," "on," "once," "one," "only," "onto," "or," "other," "others," "otherwise," "our," "ours," "ourselves," "out," "over," "own," "part," "per," "perhaps," "please," "put," "rather," "re," "same," "see," "seem," "seemed," "seeming," "seems," "serious," "several," "she," "should," "show," "side," "since," "sincere," "six," "sixty," "so," "some," "somehow," "someone," "something," "sometime," "sometimes," "somewhere," "still," "such," "system," "take," "ten," "than," "that," "the," "their," "them," "themselves," "then," "thence," "there," "thereafter," "thereby," "therefore," "therein," "thereupon," "these," "they," "thick," "thin," "third," "this," "those," "though," "three,"

"through," "throughout," "thru," "thus," "to," "together," "too," "top," "toward," "towards," "twelve," "twenty," "two," "un," "under," "until," "up," "upon," "us," "very," "via," "was," "we," "well," "were," "what," "whatever," "when," "whence," "whenever," "where," "whereafter," "whereas," "whereby," "wherein," "whereupon," "wherever," "whether," "which," "while," "whither," "who," "whoever," "whole," "whom," "whose," "why," "will," "with," "within," "without," "would," "yet," "you," "your," "yours," "yourself," and "yourselves."

Stemming usually refers to a heuristic process that chops off the ends of words aiming to achieve the goal of finding the common root for the words, often including the removal of derivational affixes. Lemmatization usually refers to classifying the words based on the morphological analysis of words, aiming to remove inflectional endings to return the base or dictionary form of a word, which is known as the lemma.

The goal of stemming and lemmatization is to reduce inflectional forms and sometimes derivationally related forms of a word to a common base form. For instance, "am," "are," and "is" can be represented by the word "be." "House," "houses," "house's," and "houses" can be represented by simply "house."

Several algorithms may be used for stemming. In one example embodiment, the Porter Stemming Algorithm, written by Martin Porter, is utilized, but other algorithms may also be utilized. The Porter stemming algorithm is a process for removing the commoner morphological and inflexional endings from English words.

The result of the token stemming 206 is a list of words. Once all the words have been tokenized, at operation 210, the TF-IDF is calculated. TF-IDF is a numerical statistic that is intended to reflect how important a word is to a document in a collection or corpus. The TF-IDF increases in value proportionally to the number of times a word appears in the document, but is offset by the frequency of the word in the corpus, which helps to adjust for the fact that some words appear more frequently in general. There are several variations for calculating the TF-IDF.

TF is the raw frequency of a term in a document, e.g., the number of times that a term occurs in a document. The IDF is a measure of how much information the word provides, that is, whether the term is common or rare across all documents. In some example embodiments, the IDF is calculated as the logarithm of the total number of documents divided by the number of documents containing the term. In other example embodiments, other equations may be utilized to calculate the IDF. The TF-IDF is then calculated as TF times the IDF, but other combinations of TF and IDF may be used to calculate the TF-IDF.

Figure 3:
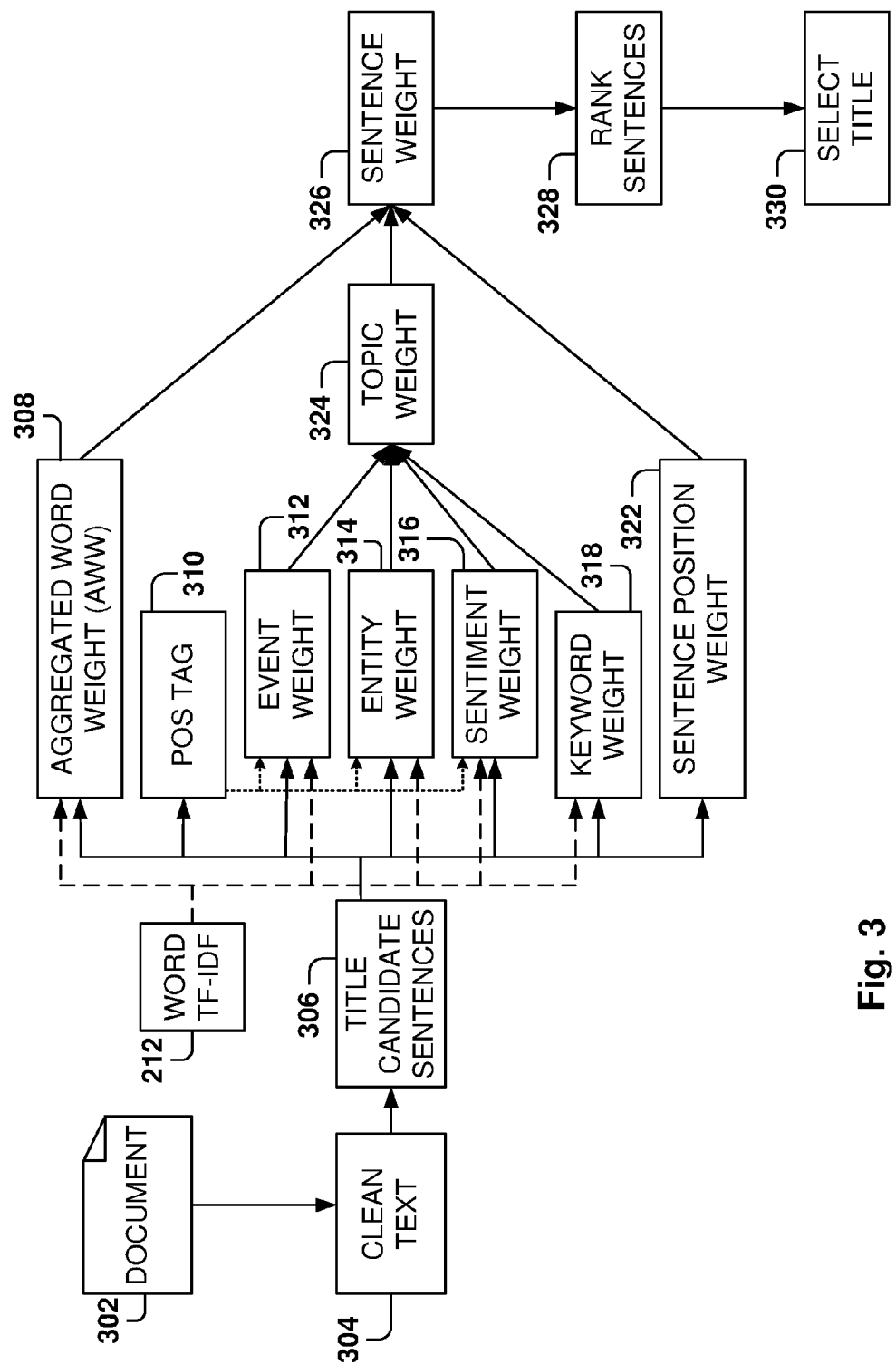
FIG. 3 is a diagram illustrating the method for selecting a title, according to some example embodiments.

FIG. 3 is a diagram illustrating the method for selecting a title, according to some example embodiments. A document 302 includes text, and the purpose is to assign a title to the document 302. For simplicity of description, the example described herein are presented with reference to a document including one paragraph, but the same principles may be applied to documents having multiple paragraphs.

At operation 212, the TF-IDFs of the words in the document are identified. The TF-IDFs are calculated in some example embodiments, as illustrated above with reference to FIG. 2. At operation 304, the text of the document is cleaned to delete certain symbols or web links. For example, tweets often contain noise text elements, including user identifiers starting with characters "#" or "@", short Uniform Resource Locator (URL) links, and re-tweet prefix "RT."

In an example embodiment, the document is cleaned using regular expressions. A regular expression, also referred to as a rational expression, is a sequence of characters that define a search pattern, and is mainly used for pattern matching within strings, or string matching. For example, regular expressions may be utilized to find a word, a character, a sequence of characters, repeated characters, special characters, the beginning of the word, a stop word, eliminate extra spaces, or any combination thereof.

In some example embodiments, the regular expression is utilized to find a pattern within the string, and then replace the pattern with something else or delete the pattern from the string. Thus, a regular expression may be used to delete "@" symbols from a string, by finding the "@" and replacing it with nothing (e.g., an empty string).

In one example embodiment, cleaning the documents includes deleting URL links and words starting with "#," "@," or "RT." The regular expression "((^[Rr][Tt][\t]+)|(@[^\\t]*)|(#[^\\t]*)|(http[^\\t]*))" may be used to perform this cleaning operation. For example, a document with the text, "RT Timothy_Hughes: How to Use LinkedIn for B2B Thought Leadership https://t.co/ZyWqRJt6Rs #socialselling https://t.co/ZyWqRJt6Rs" becomes "Timothy_Hughes: How to Use LinkedIn for B2B Thought Leadership" after clean up. It is noted that certain keywords matching the cleaning regular expression (e.g., "@lynda") may be configured to be kept in the document as defined by the service provider.

After the text has been cleaned, at operation 306, the text is broken into sentences and each sentence becomes a title candidate. The text may be broken into sentences by finding standard sentence delimiters, such as ':', '.', T, and the like. For example, the sentence "Timothy_Hughes: How to Use LinkedIn for B2B Thought Leadership" generates two title candidates: "Timothy_Hughes" and "How to Use LinkedIn for B2B Thought Leadership."

At operation 308, the aggregated weight of the words (AWW) in a sentence is calculated by adding up the TF-IDF of all the words in the sentence. For example, the AWW of the candidate sentence "How to Use LinkedIn for B2B Thought Leadership" is calculated as TF-IDF(How)+TF-IDF(To)+TF-IDF(Use)+TF-IDF(LinkedIn)+TF-IDF(for)+TF-IDF(B2B)+TF-IDF(Thought)+TF-IDF(Leadership). It is noted that in some example embodiments, common words (e.g., "the") may have a TF-IDF of 0.

At operation 310, a part of speech (POS) tag is assigned to each word. The POS tag is used in operations 312, 314, and 316 to appraise some language features of the sentence. More details on the calculation of the POS tag are provided below with reference to FIG. 4.

For each title candidate, three ingredients are extracted using natural language processing: events (e.g., a verb), entities (e.g., a noun), and sentiments (e.g., adjective, adverb). At operation 312, an event weight is calculated for each sentence, as described in more detail below with reference to FIG. 5A. At operation 314, an entity weight is calculated for each sentence, as described in more detail below with reference to FIG. 5B. At operation 316, a sentiment weight is calculated for each sentence, as described in more detail below with reference to FIG. 6A.

Further, at operation 318, a keyword weight is calculated for each sentence, as described below in more detail with reference to FIG. 6B. At operation 324, a topic weight is calculated for each sentence based on the event weight, the entity weight, the sentiment weight, and the keyboard weight. More details on how the topic weight is calculated are provided below with reference to FIG. 7A.

A sentence position weight is calculated at operation 322, as described in more detail below with reference to FIG. 7B. Further, at operation 326, a sentence weight, also referred to as a sentence score, is calculated for each sentence based on the AWW, the topic weight, and the sentence position weight. More details on how the sentence weight is calculated are provided below with reference to FIG. 8.

After all the sentences have been scored (e.g., all title candidate sentences have a sentence weight), the candidate sentences are ranked in operation 328 according to their sentence weight, and a title is selected in operation 330. The title selected for the document 302 is the sentence with the highest sentence weight.

It is noted that the embodiments illustrated in FIG. 3 are examples and do not describe every possible embodiment. Other embodiments may utilize different weights, additional or fewer parameters, different equations, and so forth. The embodiments illustrated in FIG. 3 should therefore not be interpreted to be exclusive or limiting, but rather illustrative.

Figure 4:
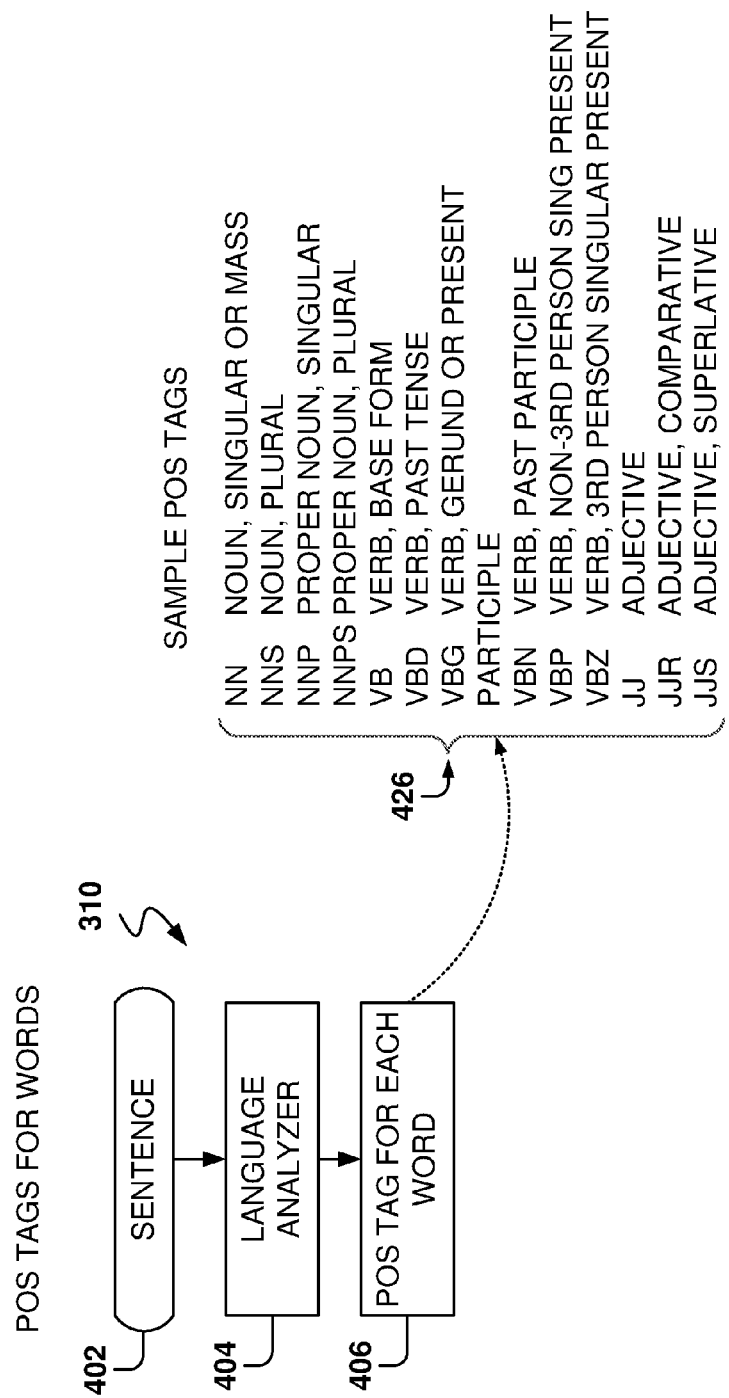
FIG. 4 is flowchart of a method, according to some example embodiments, for calculating part-of-speech (POS) tags.

FIG. 4 is flowchart of a method 310, according to some example embodiments, for calculating POS tags. POS tagging, also referred to as grammatical tagging or word-category disambiguation, is the process of assigning a part of speech tag or label to each word in the text, based on both the definition and the context of each word (e.g., relationship with adjacent and related words in a phrase, sentence, or paragraph). A simplified form of this is commonly taught in early education by identifying words as nouns, verbs, adjectives, adverbs, and so forth.

In one example embodiment, the Penn tree banking tags are utilized, but other embodiments may utilize other types of POS tags. The POS tags 426 include the following:

| | | |
|---|---|---|
| 1. | CC | Coordinating conjunction |
| 2. | CD | Cardinal number |
| 3. | DT | Determiner |
| 4. | EX | Existential there |
| 5. | FW | Foreign word |
| 6. | IN | Preposition or subordinating conjunction |
| 7. | JJ | Adjective |
| 8. | JJR | Adjective, comparative |
| 9. | JJS | Adjective, superlative |
| 10. | LS | List item marker |
| 11. | MD | Modal |
| 12. | NN | Noun, singular or mass |
| 13. | NNS | Noun, plural |
| 14. | NNP | Proper noun, singular |
| 15. | NNPS | Proper noun, plural |
| 16. | PDT | Predeterminer |
| 17. | POS | Possessive ending |
| 18. | PRP | Personal pronoun |
| 19. | PRP$ | Possessive pronoun |
| 20. | RB | Adverb |
| 21. | RBR | Adverb, comparative |
| 22. | RBS | Adverb, superlative |
| 23. | RP | Particle |
| 24. | SYM | Symbol |
| 25. | TO | to |
| 26. | UH | Interjection |
| 27. | VB | Verb, base form |
| 28. | VBD | Verb, past tense |
| 29. | VBG | Verb, gerund or present participle |
| 30. | VBN | Verb, past participle |
| 31. | VBP | Verb, non-3rd person singular present |
| 32. | VBZ | Verb, 3rd person singular present |
| 33. | WDT | Wh-determiner |
| 34. | WP | Wh-pronoun |
| 35. | WP$ | Possessive wh-pronoun |
| 36. | WRB | Wh-adverb |

In operation 404, a language analyzer is configured for processing sentence 402. In one example embodiment, a Natural Language Toolkit (NLTK) is used to identify the POS tags, but other embodiments may utilize other tools. It is noted that the same principles may be applied to other languages, but sentence analysis and parsing of words would have to be accommodated for the characteristics of the language (e.g., no space between words, language is written right to left, etc.).

In one example embodiment, the tag assigned to a word is listed next to the word separated by the string "~~". For example, the words in the sentence, "7 Ways To Make Your LinkedIn Profile Job Search Ready: Here are some tips for using LinkedIn," is POS-tagged as follows: (7~~CD) (Ways~~NNPS) (To~~TO) (Make~~VB) (Your~~PRP$) (LinkedIn~~NNP) (Profile~~NNP) (Job~~NNP) (Search~~NNP) (Ready~~NNP) (:~~:) (Here~~RB) (are~~VBP) (some~~DT) (tips~~NNS) (for~~IN) (using~~VBG) (LinkedIn~~NNP).

At operation 406, each word in the document is assigned a POS tag 426. The POS tags 426 are then used to calculate the event weights, the entity weights, and the sentiment weights.

Figure 5B:
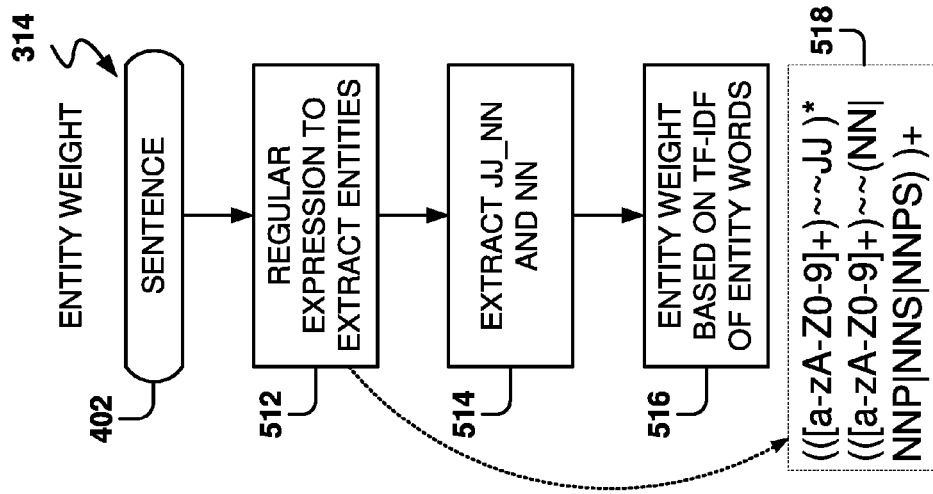
FIG. 5B is flowchart of a method, according to some example embodiments, for calculating entity weights.
Figure 5A:
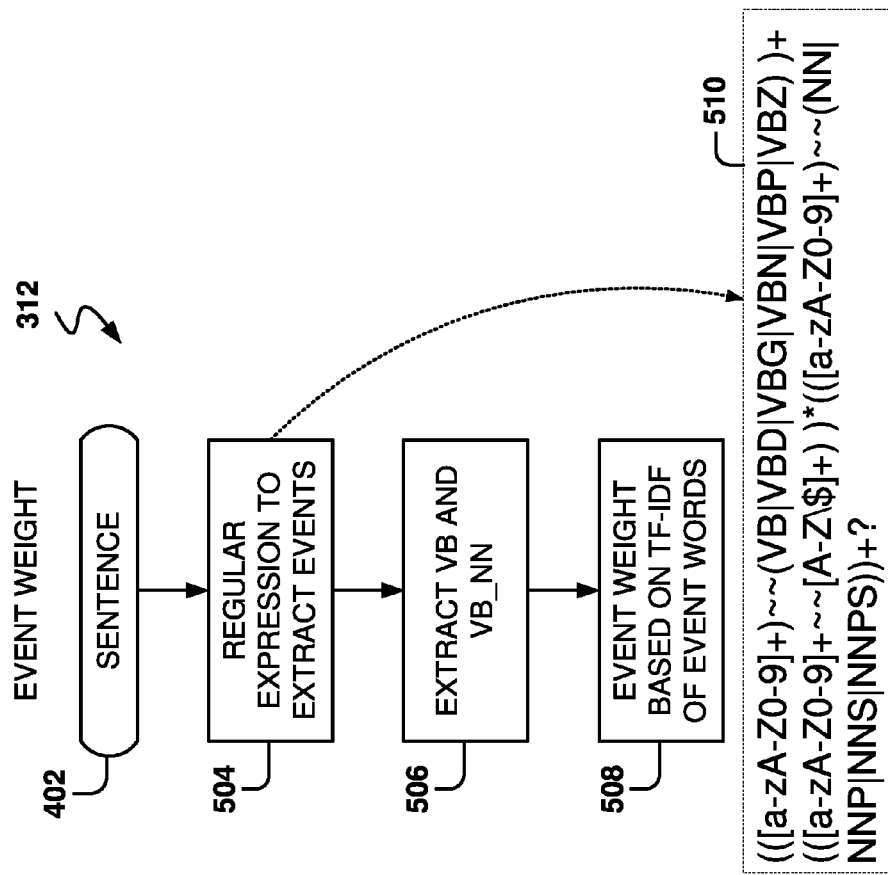
FIG. 5A is flowchart of a method, according to some example embodiments, for calculating event weights.

FIG. 5A is flowchart of a method 312, according to some example embodiments, for calculating the event weights. An event may be one or more contiguous verbs followed by zero or more nouns. Thus, an event may be expressed as "VB+ NN*", where "+" indicates one or more occurrences of the preceding element, and "*" indicates zero or more occurrences of the preceding element.

At operation 504, a regular expression is utilized to extract the events. In one example embodiment, the events are extracted from the sentence 402 utilizing the following regular expression 510:

"(([a-zA-Z0-9]+)~~(VB|VBD|VBG|VBN|VB-P|VBZ))+(([a-zA-Z0-9]+~~[A-Z\$]+))*(([a-zA-Z0-9]+)~~(NN|NNP|NNS|NNPS))+?"

At operation 506, the events are extracted, and at operation 508 the event weight is calculated as the sum of the TF-IDFs of the words found in the extracted events.

For example, for the title candidate, "Mastering the Art of Negotiation for the Best Outcomes via LinkedIn Sales Solutions Blog," the event "Mastering" is identified and the event weight is calculated as TF-IDF(Mastering).

FIG. 5B is flowchart of a method 314, according to some example embodiments, for calculating the entity weights. An entity may be zero or more adjectives followed by one or more nouns. Thus, an entity may be expressed as "JJ*NN+".

At operation 512, a regular expression is utilized to extract the entities. In one example embodiment, the entities are extracted from the sentence 402 utilizing the following regular expression 518:

"(([a-zA-Z0-9]+)~~JJ)*(([a-zA-Z0-9]+)~~(NN|NNP|NNS|NNPS))+".

At operation 514, the entities are extracted, and at operation 516 the entity weight is calculated as the sum of the TF-IDFs of the words found in the extracted entities.

For example, for the title candidate, "Mastering the Art of Negotiation for the Best Outcomes via LinkedIn Sales Solutions Blog," the entities "Art," "Negotiation," "Outcomes," "LinkedIn," "Sales," "Solutions," and "Blogs" are identified. The entity weight is calculated as TF-IDF(Art)+TF-IDF(Negotiation)+TF-IDF(Outcomes)+TF-IDF(LinkedIn)+TF-IDF(Sales)+TF-IDF(Solutions)+TF-IDF(Blogs).

Figure 6B:
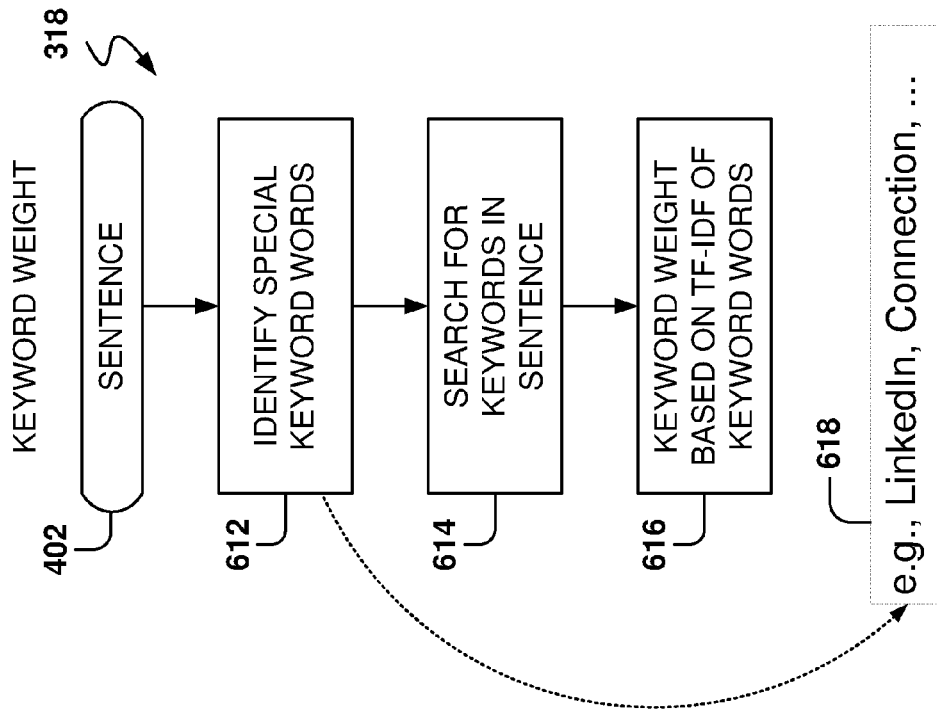
FIG. 6B is flowchart of a method, according to some example embodiments, for calculating keyword weights.
Figure 6A:
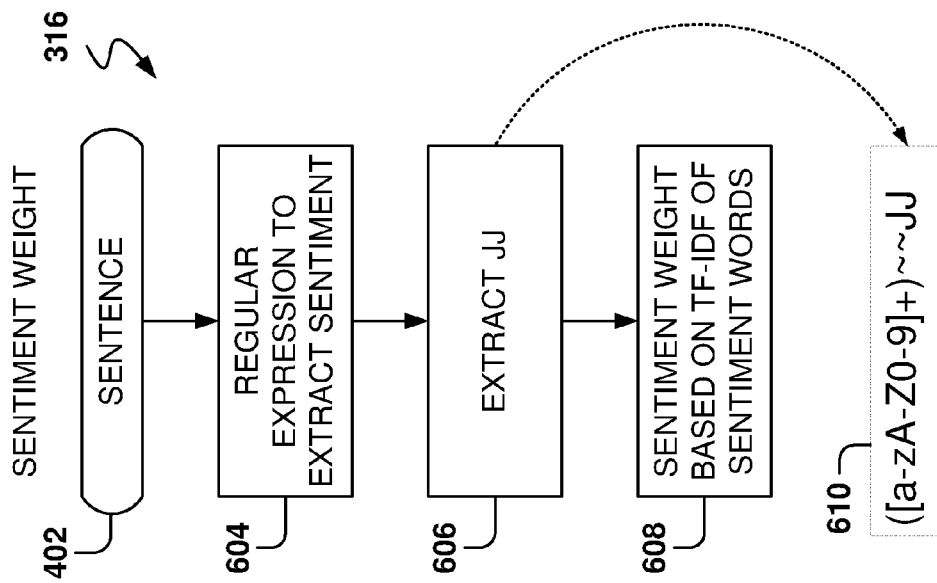
FIG. 6A is flowchart of a method, according to some example embodiments, for calculating sentiment weights.

FIG. 6A is flowchart of a method 316, according to some example embodiments, for calculating the sentiment weights. A sentiment is one or more adjectives. Thus, a sentiment may be expressed as "JJ+".

At operation 604, a regular expression 610 is utilized to extract the sentiments from sentence 402. In one example embodiment, the sentiments are extracted from the sentence 402 utilizing the following regular expression 610:

"([a-zA-Z0-9]+)~~JJ".

At operation 606, the sentiments are extracted, and at operation 608 the sentiment weight is calculated as the sum of the TF-IDFs of the words found in the extracted sentiments.

For example, for the title candidate, "Mastering the Art of Negotiation for the Best Outcomes via LinkedIn Sales Solutions Blog," the sentiment "Best" is identified. The sentiment weight is calculated as TF-IDF(Best).

FIG. 6B is flowchart of a method 318, according to some example embodiments, for calculating the keyword weights. As used herein, keywords 618 are special words defined by the service provider. For example, keywords 618 may relate to the business of the service provider, e.g., the company name of the service provider (LinkedIn), a word associated with the service (Connection), or the name of an advertiser, or words indicating worthy news (e.g., urgent, murder, kidnapping), and so forth. Having keywords in the sentence increases the score of the sentence by adding the keyword weight.

At operation 612, the keywords 618 are identified, and at operation 614, the sentence 402 is searched for the appearance of the keywords. In one example embodiment, the keywords are stored in a file, and the search is performed base on the content of the keyword file. At operation 616, the keyword weight is calculated as the sum of the TF-IDFs of the found keywords.

FIG. 7A is flowchart of a method 324, according to some example embodiments, for calculating the topic weight. The topic weight 704 of a sentence 402 is a weighted sum of the event weight, the entity weight, the sentiment weight, and the keyword weight. The topic weight is calculated in operation 702. In one example embodiment, the topic weight 704 is calculated utilizing the following equation:

Topic weight=$K_1$·event weight+$K_2$·entity weight+ $K_3$·sentiment weight+$K_4$·keyword weight.

Where $K_1$, $K_2$, $K_3$, and $K_4$ are constants that may be tuned depending on the relevance of the corresponding parameter. In one example embodiment, $K_1$, $K_2$, $K_3$, and $K_4$ are set to 1, but other values are also possible.

FIG. 7B is flowchart of a method 322, according to some example embodiments, for calculating the sentence position weight. Another factor for selecting the title is the position of the candidate sentence 402 within the document (e.g., the position within paragraph if the document includes just one paragraph). In general, the sentences at the beginning of the document are better candidates for the title because these sentences are more likely to carry an expression of the subject idea within the document.

At operation 706, the position weight is assigned based on the position of the sentence within the paragraph. There are different ways of assigning A position weight 712 to each candidate. For example, a decreasing linear function may be utilized, an exponential function, a step function, and so forth.

In one example embodiment, the position weight 712 is calculated according to the values presented in table 708. For each paragraph position 710, the corresponding position weight 712 is given. In the example embodiment of FIG. 7B, the position weight 712 is calculated as the maximum between 0.1 and (1-0.2N), where N is the position of the sentence within the paragraph. In this example embodiment, each sentence is assigned at least a position weight 712 of 0.1. The first sentence is assigned a weight of 0.8, and then following sentences have position weight 712 that decreases by a factor of 0.2, until the minimum of 0.1 is reached.

Figure 8:
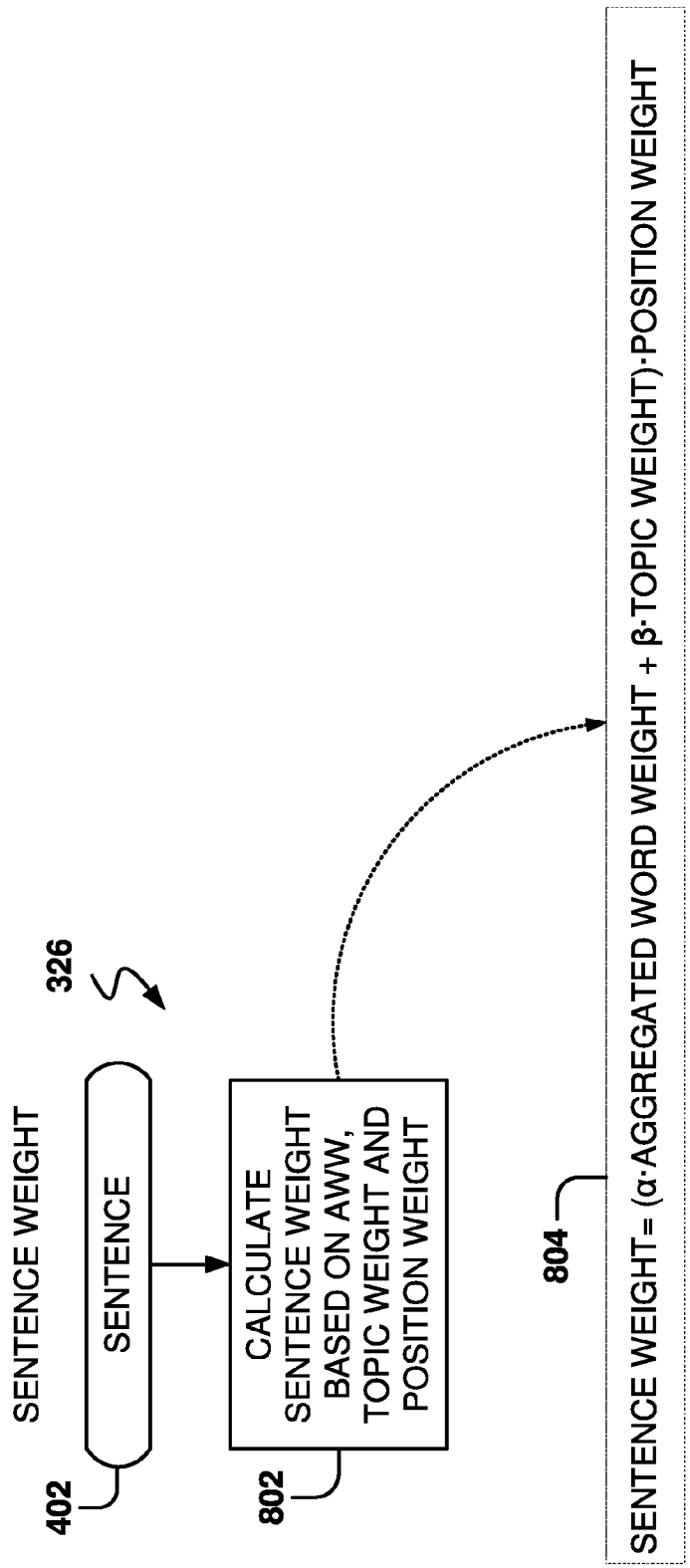
FIG. 8 is flowchart of a method, according to some example embodiments, for calculating a sentence weight.

FIG. 8 is flowchart of a method 326, according to some example embodiments, for calculating the sentence weight. The sentence weight for sentence 402 is calculated based on the parameters previously defined. Different parameters may be given different weights and different mathematical operations may also be utilized (e.g., multiplication, exponentials, fractions, etc.). In some example embodiments, the sentence weight may be calculated utilizing a subset of the parameters described hereinabove.

At operation 802, the sentence weight is calculated based on the AWW, the topic weight, and the position weight. In one example embodiment, the sentence weight is calculated utilizing equation 804 as follows:

Sentence weight=($\alpha$·AWW+$\beta$·topic weight)·position weight.

Where $\alpha$ and $\beta$ are tunable parameters for configuring the title-selection system.

It is noted that the embodiments illustrated in FIGS. 3-8 are examples and do not describe every possible embodiment. Other embodiments may utilize different equations, weights, fewer parameters, different equations for calculating each of the parameters, and the like. The embodiments illustrated in FIGS. 3-8 should therefore not be interpreted to be exclusive or limiting, but rather illustrative.

Figure 9:
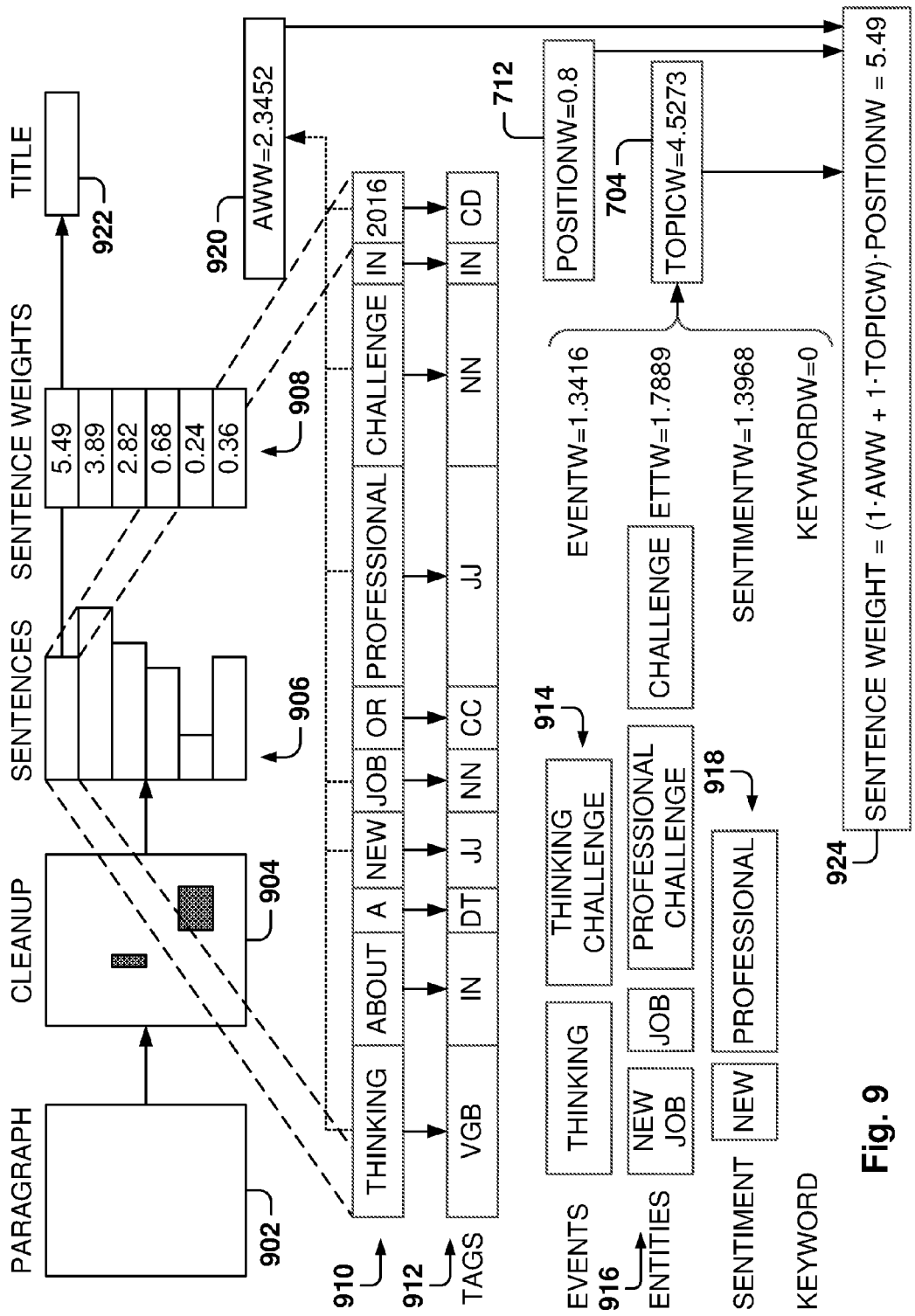
FIG. 9 is a diagram illustrating an example embodiment for selecting a topic.

FIG. 9 is a diagram illustrating an example embodiment for selecting a topic. FIG. 9 illustrates the process for selecting a title for the following paragraph 902:

"Thinking about a new job or professional challenge in 2016? Discover opportunities with Corp worldwide to improve health and make people feel better. Visit Corp's LinkedIn Career page to learn more about our talented people, our quality medicines and our commitment to patients. http://ow.ly/4nnEfs Corp Pharmaceuticals—Careers & Employment Corp Pharmaceutical Industries Ltd"

The paragraph 902 is cleaned by removing predefined characters to obtain cleanup paragraph 904. The clean up operation deletes the apostrophe from "Corp's" to obtain "Corp" and deletes the URL http://ow.ly/4nnEfs. Thus, clean paragraph 904 is as follows:

"Thinking about a new job or professional challenge in 2016? Discover opportunities with Corp worldwide to improve health and make people feel better. Visit Corp LinkedIn Career page to learn more about our talented people, our quality medicines and our commitment to patients. Corp Pharmaceuticals—Careers & Employment Corp Pharmaceutical Industries Ltd"

Next, the cleanup paragraph 904 is broken into sentences 906 based on predefined sentence delimiters, resulting in the following sentences 906:

"Thinking about a new job or professional challenge in 2016,"

"Discover opportunities with Corp worldwide to improve health and make people feel better,"

"Visit Corp LinkedIn Career page to learn more about our talented people,"

"our quality medicines and our commitment to patients,"

"Corp Pharmaceuticals," and

"Careers & Employment Corp Pharmaceutical Industries Ltd"

Next, the sentence weights 924 are calculated for each of the sentences, which are the candidates for selecting a title for the paragraph 902. FIG. 9 details how the score is obtained for the first sentence, and the other sentences are scored following the same procedure. The first sentence is tokenized into words 910. The words 910 are" "Thinking," "about," "a," "new," "job," "or," "professional," "challenge," "in," and "2016."

Language processing is performed to identify the POS tags 912 for the words. The result includes the following POS tags: "Thinking~~VBG," "about~~IN," "a~~DT," "new~~JJ," "job~~NN," "or~~CC," "professional~~JJ," "challenge~~NN," "in~~IN," and "2016~~CD."

After the POS tags 912 have been identified, the events 914, entities 916, sentiments 918, and keywords are identified based on the POS tags 912. The events 916 extracted are "Thinking" (a verb) and "Thinking challenge" (verb plus noun). It is noted that the matching expression, in one example embodiment, includes zero or more words between the verb and the noun. The event weight is calculated as TF-IDF(think)+TF-IDF(challenge)=1.3416407865.

The entities 916 include "new job" (adjective plus noun), "job" (noun), "professional challenge" (adjective plus noun), and "challenge" (noun). The entity weight is calculated as TF-IDF(profession)+TF-IDF(new)+TF-IDF(job)+TF-IDF(challenge)=1.78890763314.

The sentiments 918 include the adjectives "new" and "professional." The sentiment weight is calculated as TF-IDF(new)+TF-IDF(profession)=1.39680949882.

There are no special keywords in the first sentence. Therefore, the keyword weight is zero. The topic weight 704 is the sum of the event weight, entity weight, sentiment weight, and keyword weight. Therefore, topic weight 704 is equal to: 1.3416407865+1.78890763314+1.39680949882+0=4.52735791846.

The AWW 920 is calculated by adding the TF-IDFs of all the words in the sentence. Some of the most common words have a TF-IDF of 0, and in this example embodiment, the AWW 920 is equal to: TF-IDF(think)+TF-IDF (profession)+TF-IDF (new)+TF-IDF (job)+TF-IDF (challenge)+TF-IDF (2016)=2.34521685957.

The position weight 712 is equal to 0.8, which is the weight assigned to the first sentence. In this example embodiment, the total sentence weight 924 is calculated using the following equation:

Sentence weight=(α·AWW+β·topic weight)·position weight.

Here, α and β are set to 1, therefore, the sentence weight 804 is equal to: (1*2.34521685957+1*4.52735791846) *0.8=5.49805982242.

The other sentences are scored following the same operations. The respective scores for sentences 1 to 6 are 5.49805982242, 3.89029397067, 2.82706197349, 0.681675837545, 0.241421356237, and 0.360217130901. The sentence weights 908 are then examined and the sentence with the highest weight is selected as the title 922. In this case, sentence 1, "Thinking about a new job or professional challenge in 2016?" is selected as the title. In other example embodiment, the title selected is sentence 1 without the question mark, as in "Thinking about a new job or professional challenge in 2016."

Figure 10:
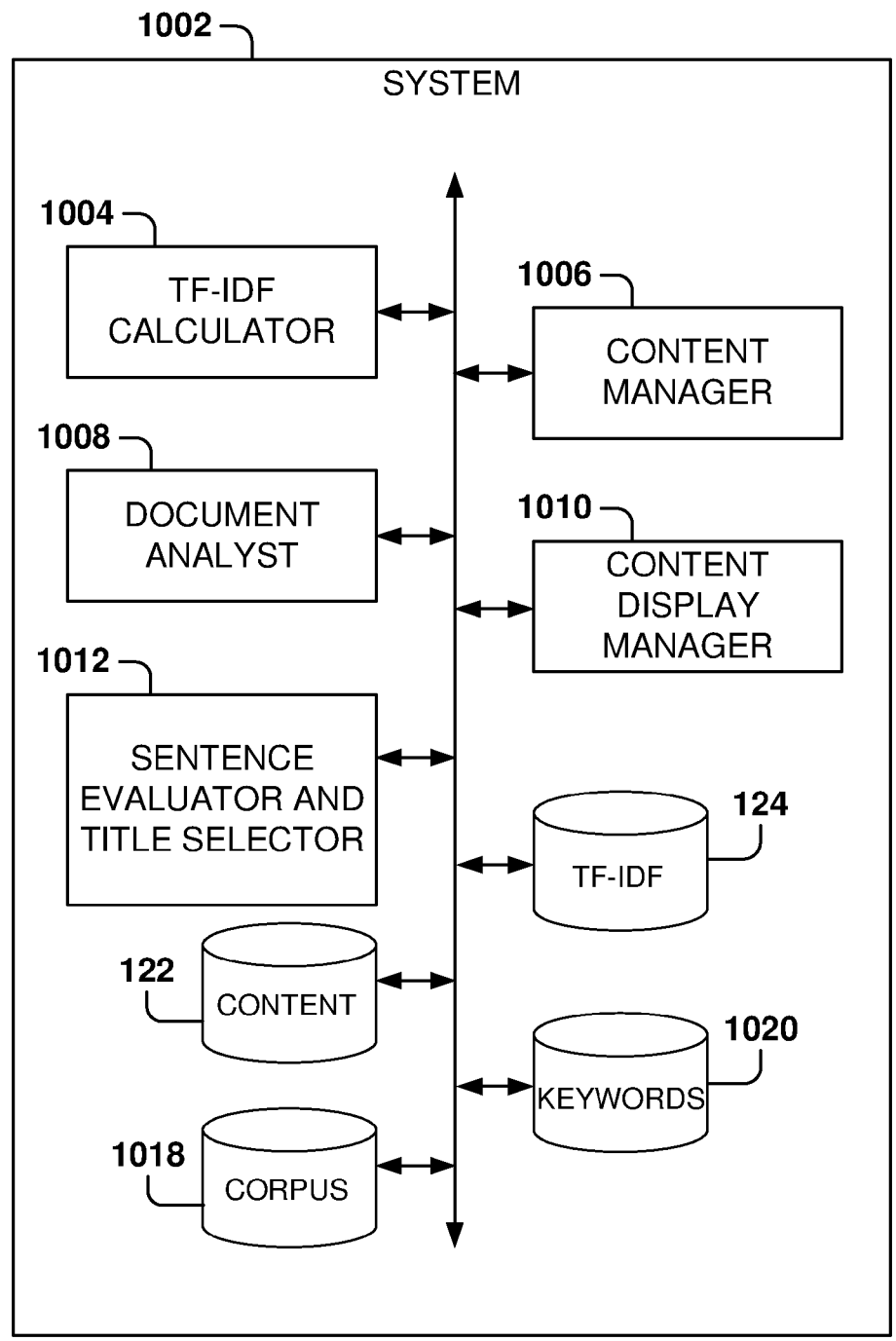
FIG. 10 is a system for implementing example embodiments.

FIG. 10 is a system 1002 for implementing example embodiments. The system 1002 includes a TF-IDF calculator 1004, a document analyst 1008, a sentence evaluator and title selector 1012, a content manager 1006, and a content display manager 1010. In addition, the system 1002 includes the following data stores: a TF-IDF database 124, a content database 122, keywords database 1020, and corpus database 1018.

The TF-IDF calculator 1004 calculates the TF-IDFs of the words in the corpus database 1020. The corpus database 1018 includes a corpus of documents, which may include webpages, social posts, tweets, text messages, news articles, text documents, presentations, and the like.

The content manager 1006 manages the content presented to users in the social network. The document analyst 1008 analyzes the documents in the corpus database 1018 in order to identify words and their frequency. The results are used by the TF-IDF calculator 1004 to calculate the TD-IDFs.

The content display manager 1010 presents the content (storing content database 122) to users of the social network, including presenting a title selected for one or more documents. The sentence evaluator and title selector 1012 selects titles for documents by breaking the documents into sentences and then weighing each of the sentences, as described above. The keywords database 1020 includes a list of keywords, as described above with reference to FIG. 6B.

It is noted that the embodiments illustrated in FIG. 10 are examples and do not describe every possible embodiment. Other embodiments may utilize different modules, combine the functionality of modules into one, distribute the functionality of the module across a plurality of servers, and so forth. The embodiments illustrated in FIG. 10 should therefore not be interpreted to be exclusive or limiting, but rather illustrative.

Figure 11:
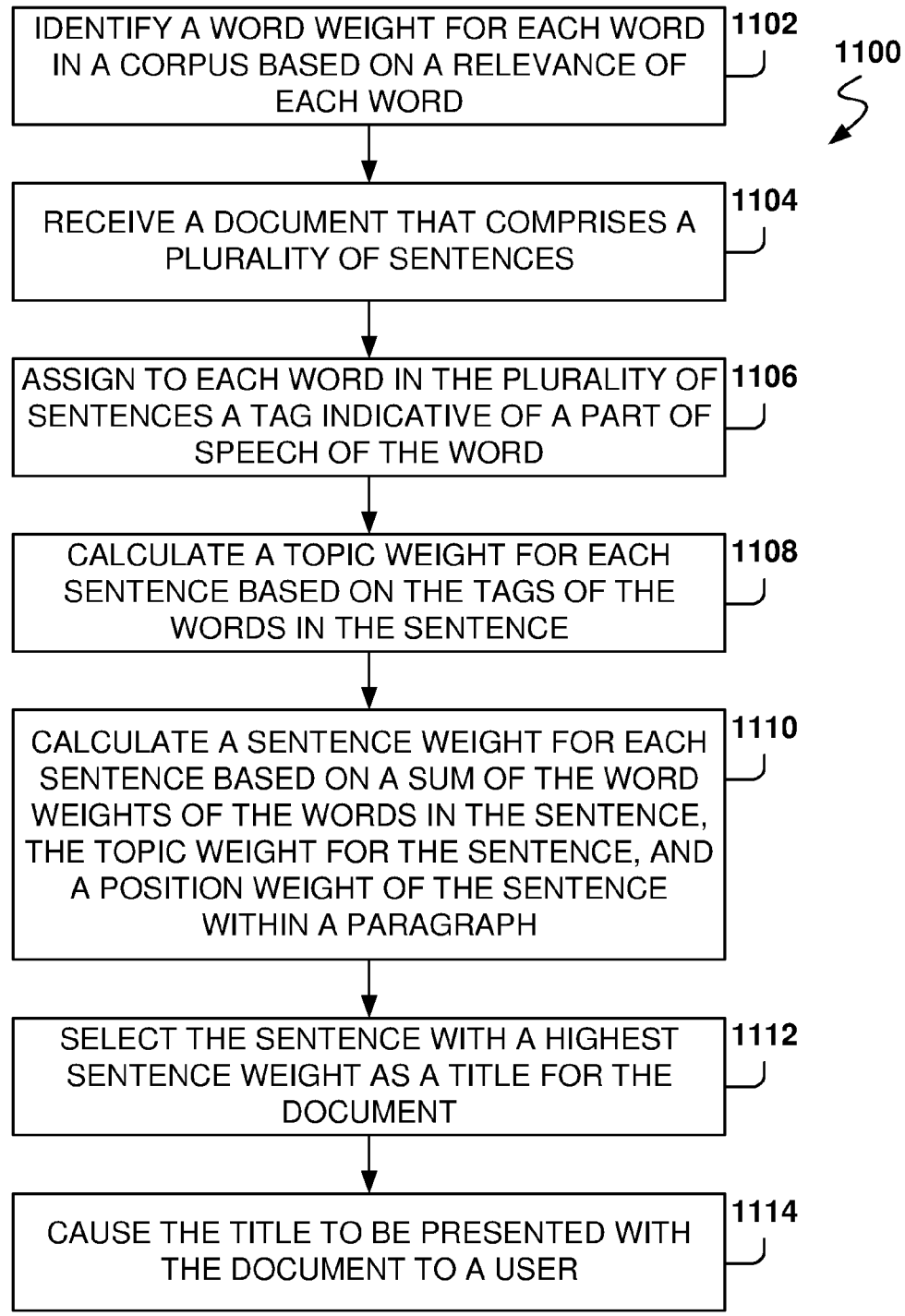
FIG. 11 is a flowchart of a method, according to some example embodiments, for selecting a title for a post of a social network.

FIG. 11 is a flowchart of a method 1100, according to some example embodiments, for selecting a title for a post of a social network. At operation 1102, a word weight is identified for each word in a corpus based on a relevance of each word. From operation 1102, the method flows to operation 1104 for receiving a document that comprises a plurality of sentences in order to select a title for that document.

From operation 1104, the method flows to operation 1106 for assigning to each word in the plurality of sentences a tag indicative of a part of speech of the word (see, for example, FIG. 4). From operation 1106, the method flows to operation 1108, where a topic weight is calculated for each sentence based on the tags of the words in the sentence (see for example FIGS. 5A-5B, 6A-6B, and 7A).

From operation 1108, the method flows to operation 1110, where a sentence weight is calculated for each sentence based on the sum of the word weights of the words in the sentence, the topic weight for the sentence, and a position weight of the sentence within a paragraph (see for example FIGS. 8 and 9).

From operation 1110, the method flows to operation 1112 for selecting the sentence with a highest sentence weight as a title for the document. Operation 1114 is for causing the title to be presented with the document to a user (see, for example, FIG. 1).

Implementations may include one or more of the following features. The method 1100 as recited, where calculating the topic weight further includes calculating an event weight for the sentence based on the tags of the words in the sentence, calculating an entity weight for the sentence based on the tags of the words in the sentence, and calculating a sentiment weight for the sentence based on the tags of the words in the sentence. The method 1100, where calculating the topic weight further includes calculating the topic weight of the sentence as a weighted sum of the event weight, the entity weight, and the sentiment weight of the sentence.

In one example embodiment, calculating the event weight further includes extracting events from the sentence, where each event includes a verb or a verb and a noun, and calculating the event weight of the sentence as a sum of the word weights of the words in the extracted events. In one example embodiment, calculating the entity weight further includes extracting entities from the sentence, where each entity includes a noun or an adjective and a noun, and includes calculating the entity weight of the sentence as a sum of the word weights of the words in the extracted entities.

In another example embodiment, calculating the sentiment weight further includes extracting sentiments from the sentence, where each sentiment includes an adjective, and calculating the sentiment weight of the sentence as a sum of the word weights of the words in the extracted sentiments. In one example embodiment, assigning to each word the tag further includes utilizing a natural language processor to determine a part of speech to the word, and assigning the tag based on the determined part of speech. Further, in one example embodiment, identifying the word weight further includes identifying words in the corpus, stemming the words in the corpus, determining a frequency of occurrence in the corpus for each stemmed word, and assigning the word weight to the stemmed words based on the frequency of occurrence.

In one aspect, calculating the sentence weight for each sentence further includes calculating a position weight for the sentence as a maximum between a first constant and a second constant minus a position of the sentence within the paragraph times a third constant. In another example embodiment, calculating the sentence weight for each sentence further includes calculating the sentence weight as the position weight times a weighted sum of the topic weight and the sum of the word weights of the words in the sentence.

Figure 12:
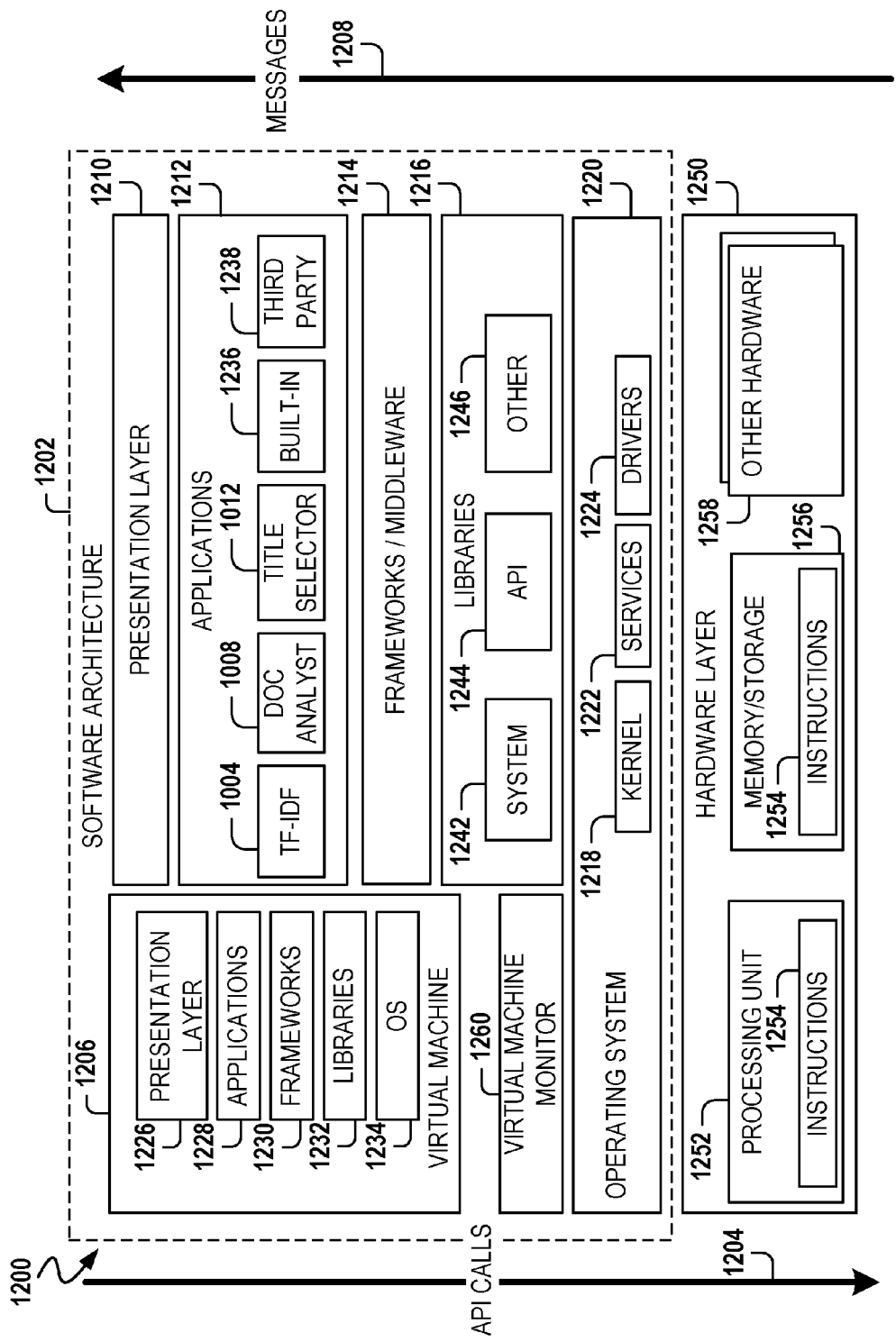
FIG. 12 is a block diagram illustrating an example of a software architecture that may be installed on a machine, according to some example embodiments.

FIG. 12 is a block diagram 1200 illustrating a representative software architecture 1202, which may be used in conjunction with various hardware architectures herein described. FIG. 12 is merely a non-limiting example of a software architecture 1202 and it will be appreciated that many other architectures may be implemented to facilitate the functionality described herein. The software architecture 1202 may be executing on hardware such as a machine 1300 of FIG. 13 that includes, among other things, processors 1304, memory/storage 1306, and input/output (I/O) components 1318. A representative hardware layer 1250 is illustrated and can represent, for example, the machine 1300 of FIG. 13. The representative hardware layer 1250 comprises one or more processing units 1252 having associated executable instructions 1254. The executable instructions 1254 represent the executable instructions of the software architecture 1202, including implementation of the methods, modules and so forth of the Figures described above. The hardware layer 1250 also includes memory and/or storage modules 1256, which also have the executable instructions 1254. The hardware layer 1250 may also comprise other hardware 1258 which represents any other hardware of the hardware layer 1250, such as the other hardware illustrated as part of the machine 1300.

In the example architecture of FIG. 12, the software architecture 1202 may be conceptualized as a stack of layers where each layer provides particular functionality. For example, the software architecture 1202 may include layers such as an operating system 1220, libraries 1216, frameworks/middleware 1214, applications 1212, and a presentation layer 1210. Operationally, the applications 1212 and/or other components within the layers may invoke API calls 1204 through the software stack and receive a response, returned values, and so forth illustrated as messages 1208 in response to the API calls 1204. The layers illustrated are representative in nature and not all software architectures have all layers. For example, some mobile or special purpose operating systems may not provide a frameworks/middleware layer 1214, while others may provide such a layer. Other software architectures may include additional or different layers.

The operating system 1220 may manage hardware resources and provide common services. The operating system 1220 may include, for example, a kernel 1218, services 1222, and drivers 1224. The kernel 1218 may act as an abstraction layer between the hardware and the other software layers. For example, the kernel 1218 may be responsible for memory management, processor management (e.g., scheduling), component management, networking, security settings, and so on. The services 1222 may provide other common services for the other software layers. The drivers 1224 may be responsible for controlling or interfacing with the underlying hardware. For instance, the drivers 1224 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1216 may provide a common infrastructure that may be utilized by the applications 1212 and/or other components and/or layers. The libraries 1216 typically provide functionality that allows other software modules to perform tasks in an easier fashion than to interface directly with the underlying operating system 1220 functionality (e.g., kernel 1218, services 1222, and/or drivers 1224). The libraries 1216 may include system libraries 1242 (e.g., C standard library) that may provide functions such as memory allocation functions, string manipulation functions, mathematic functions, and the like. In addition, the libraries 1216 may include API libraries 1244 such as media libraries (e.g., libraries to support presentation and manipulation of various media formats such as MPEG4, H.264, MP3, AAC, AMR, JPG, PNG), graphics libraries (e.g., an OpenGL framework that may be used to render two-dimensional and three-dimensional graphic content on a display), database libraries (e.g., SQLite that may provide various relational database functions), web libraries (e.g., WebKit that may provide web browsing functionality), and the like. The libraries 1216 may also include a wide variety of other libraries 1246 to provide many other APIs to the applications 1212 and other software components/modules.

The frameworks 1214 (also sometimes referred to as middleware) may provide a higher-level common infrastructure that may be utilized by the applications 1212 and/or other software components/modules. For example, the frameworks 1214 may provide various graphic user interface (GUI) functions, high-level resource management, high-level location services, and so forth. The frameworks 1214 may provide a broad spectrum of other APIs that may be utilized by the applications 1212 and/or other software components/modules, some of which may be specific to a particular operating system or platform.

The applications 1212 include TF-IDF calculator 1004, document analyst 1008, title selector 1012, built-in applications 1236 and third-party applications 1238. Examples of representative built-in applications 1236 may include, but are not limited to, a contacts application, a browser application, a book reader application, a location application, a media application, a messaging application, and/or a game application. The third-party applications 1238 may include any of the built-in applications 1236 as well as a broad assortment of other applications. In a specific example, the third-party application 1238 (e.g., an application developed using the Android™ or iOS™ software development kit (SDK) by an entity other than the vendor of the particular platform) may be mobile software running on a mobile operating system such as iOS™, Android™ Windows® Phone, or other mobile operating systems. In this example, the third-party application 1238 may invoke the API calls 1204 provided by the mobile operating system such as the operating system 1220 to facilitate functionality described herein.

The applications 1212 may utilize built-in operating system functions (e.g., kernel 1218, services 1222, and/or drivers 1224), libraries (e.g., system libraries 1242, API libraries 1244, and other libraries 1246), or frameworks/middleware 1214 to create user interfaces to interact with users of the system. Alternatively, or additionally, in some systems, interactions with a user may occur through a presentation layer, such as the presentation layer 1210. In these systems, the application/module "logic" can be separated from the aspects of the application/module that interact with a user.

Some software architectures utilize virtual machines. In the example of FIG. 12, this is illustrated by a virtual machine 1206. A virtual machine creates a software environment where applications/modules can execute as if they were executing on a hardware machine (such as the machine 1300 of FIG. 13, for example). The virtual machine 1206 is hosted by a host operating system (e.g., operating system 1220 in FIG. 12) and typically, although not always, has a virtual machine monitor 1260, which manages the operation of the virtual machine 1206 as well as the interface with the host operating system (e.g., operating system 1220). A software architecture executes within the virtual machine 1206 such as an operating system 1234, libraries 1232, frameworks/middleware 1230, applications 1228, and/or a presentation layer 1226. These layers of software architecture executing within the virtual machine 1206 can be the same as corresponding layers previously described or may be different.

Figure 13:
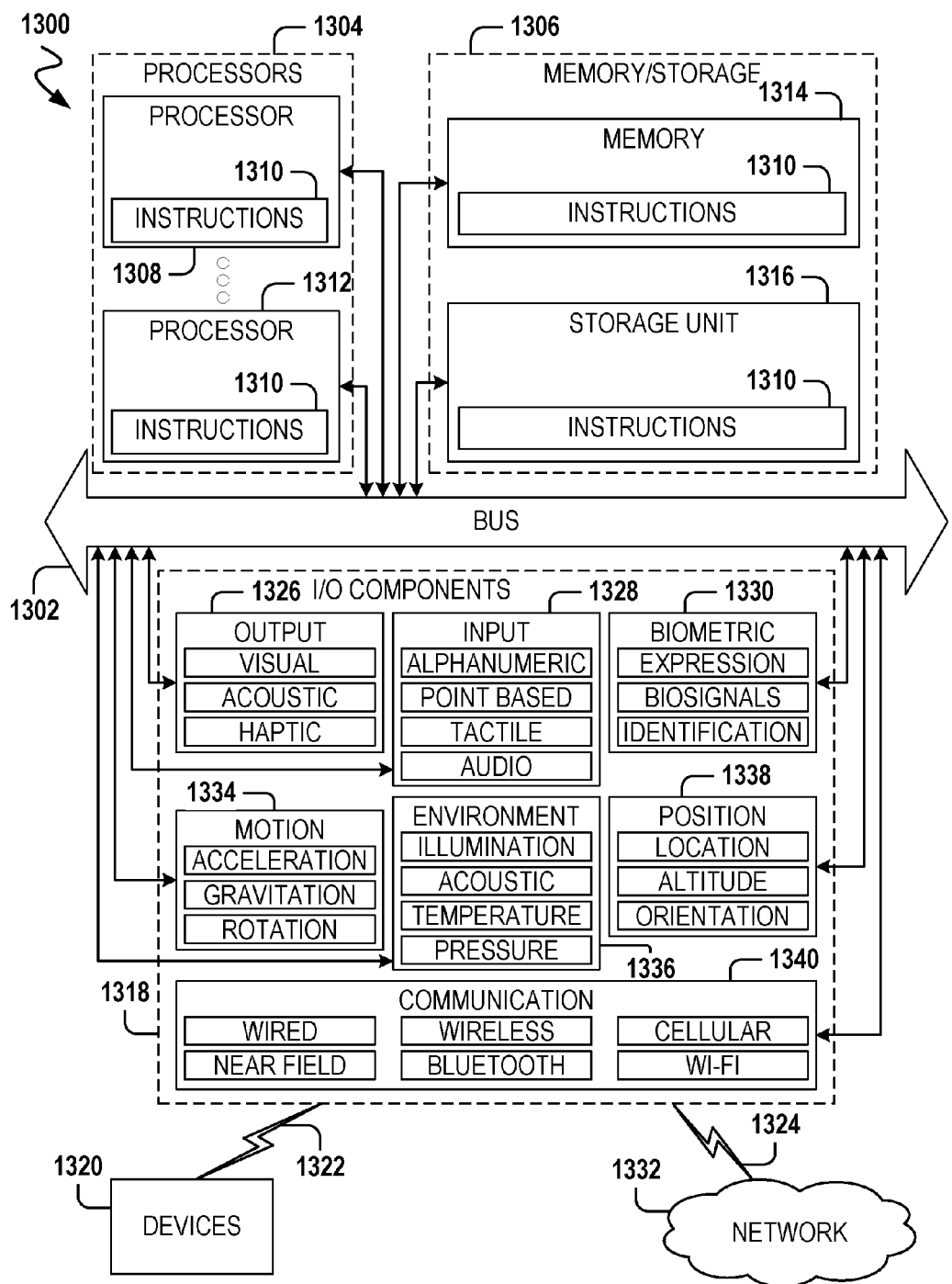
FIG. 13 illustrates a diagrammatic representation of a machine in the form of a computer system within which a set of instructions may be executed for causing the machine to perform any one or more of the methodologies discussed herein, according to an example embodiment.

FIG. 13 is a block diagram illustrating components of a machine 1300, according to some example embodiments, able to read instructions from a machine-readable medium (e.g., a machine-readable storage medium) and perform any one or more of the methodologies discussed herein. Specifically, FIG. 13 shows a diagrammatic representation of the machine 1300 in the example form of a computer system, within which instructions 1310 (e.g., software, a program, an application, an applet, an app, or other executable code) for causing the machine 1300 to perform any one or more of the methodologies discussed herein may be executed. For example, the instructions 1310 may cause the machine 1300 to execute the flow diagrams of FIGS. 2-4, 5A, 5B, 6A, 6B, 7A, 7B, 8, and 9. Additionally, or alternatively, the instructions 1310 may implement the modules of FIG. 10, and so forth. The instructions 1310 transform the general, non-programmed machine 1300 into a particular machine 1300 programmed to carry out the described and illustrated functions in the manner described.

In alternative embodiments, the machine 1300 operates as a standalone device or may be coupled (e.g., networked) to other machines. In a networked deployment, the machine 1300 may operate in the capacity of a server machine or a client machine in a server-client network environment, or as a peer machine in a peer-to-peer (or distributed) network environment. The machine 1300 may comprise, but not be limited to, a switch, a controller, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1310, sequentially or otherwise, that specify actions to be taken by the machine 1300. Further, while only a single machine 1300 is illustrated, the term "machine" shall also be taken to include a collection of machines 1300 that individually or jointly execute the instructions 1310 to perform any one or more of the methodologies discussed herein.

The machine 1300 may include processors 1304, memory/storage 1306, and I/O components 1318, which may be configured to communicate with each other such as via a bus 1302. In an example embodiment, the processors 1304 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1308 and a processor 1312 that may execute the instructions 1310. The term "processor" is intended to include multi-core processors that may comprise two or more independent processors (sometimes referred to as "cores") that may execute instructions contemporaneously. Although FIG. 13 shows multiple processors 1304, the machine 1300 may include a single processor with a single core, a single processor with multiple cores (e.g., a multi-core processor), multiple processors with a single core, multiple processors with multiples cores, or any combination thereof.

The memory/storage 1306 may include a memory 1314, such as a main memory, or other memory storage, and a storage unit 1316, both accessible to the processors 1304 such as via the bus 1302. The storage unit 1316 and memory 1314 store the instructions 1310 embodying any one or more of the methodologies or functions described herein. The instructions 1310 may also reside, completely or partially, within the memory 1314, within the storage unit 1316, within at least one of the processors 1304 (e.g., within the processor's cache memory), or any suitable combination thereof, during execution thereof by the machine 1300. Accordingly, the memory 1314, the storage unit 1316, and the memory of the processors 1304 are examples of machine-readable media.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store the instructions 1310. The term "machine-readable medium" shall also be taken to include any medium, or combination of multiple media, that is capable of storing instructions (e.g., instructions 1310) for execution by a machine (e.g., machine 1300), such that the instructions, when executed by one or more processors of the machine (e.g., processors 1304), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 1318 may include a wide variety of components to receive input, provide output, produce output, transmit information, exchange information, capture measurements, and so on. The specific I/O components 1318 that are included in a particular machine will depend on the type of machine. For example, portable machines such as mobile phones will likely include a touch input device or other such input mechanisms, while a headless server machine will likely not include such a touch input device. It will be appreciated that the I/O components 1318 may include many other components that are not shown in FIG. 13. The I/O components 1318 are grouped according to functionality merely for simplifying the following discussion, and the grouping is in no way limiting. In various example embodiments, the I/O components 1318 may include output components 1326 and input components 1328. The output components 1326 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1328 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In further example embodiments, the I/O components 1318 may include biometric components 1330, motion components 1334, environmental components 1336, or position components 1338 among a wide array of other components. For example, the biometric components 1330 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1334 may include acceleration sensor components (e.g., accelerometer), gravitation sensor components, rotation sensor components (e.g., gyroscope), and so forth. The environmental components 1336 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1338 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1318 may include communication components 1340 operable to couple the machine 1300 to a network 1332 or devices 1320 via a coupling 1324 and a coupling 1322, respectively. For example, the communication components 1340 may include a network interface component or other suitable device to interface with the network 1332. In further examples, the communication components 1340 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1320 may be another machine or any of a wide variety of peripheral devices (e.g., a peripheral device coupled via a USB).

Moreover, the communication components 1340 may detect identifiers or include components operable to detect identifiers. For example, the communication components 1340 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1340, such as location via Internet Protocol (IP) geo-location, location via Wi-Fi® signal triangulation, location via detecting an NFC beacon signal that may indicate a particular location, and so forth.

In various example embodiments, one or more portions of the network 1332 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 1332 or a portion of the network 1332 may include a wireless or cellular network and the coupling 1324 may be a Code Division Multiple Access (CDMA) connection, a Global System for Mobile communications (GSM) connection, or another type of cellular or wireless coupling. In this example, the coupling 1324 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 1310 may be transmitted or received over the network 1332 using a transmission medium via a network interface device (e.g., a network interface component included in the communication components 1340) and utilizing any one of a number of well-known transfer protocols (e.g., hypertext transfer protocol (HTTP)). Similarly, the instructions 1310 may be transmitted or received using a transmission medium via the coupling 1322 (e.g., a peer-to-peer coupling) to the devices 1320. The term "transmission medium" shall be taken to include any intangible medium that is capable of storing, encoding, or carrying the instructions 1310 for execution by the machine 1300, and includes digital or analog communications signals or other intangible media to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
    identifying a word weight for each word in a corpus based on a relevance of each word;
    receiving a document that comprises a plurality of sentences;
    assigning to each word in the plurality of sentences a tag indicative of a part of speech of the word;
    calculating a topic weight for each sentence based on the tags of the words in the sentence, wherein calculating the topic weight further comprises:
        calculating an event weight for the sentence based on the tags of the words in the sentence;
        calculating an entity weight for the sentence based on the tags of the words in the sentence; and
        calculating a sentiment weight for the sentence based on the tags of the words in the sentence;
    calculating a sentence weight for each sentence based on a sum of the word weights of the words in the sentence, the topic weight for the sentence, and a position weight of the sentence within a paragraph;
    selecting the sentence with a highest sentence weight as a title for the document; and
    causing the title to be presented with the document to a user.

2. The method as recited in claim 1, wherein calculating the topic weight further comprises:
    calculating the topic weight of the sentence as a weighted sum of the event weight, the entity weight, and the sentiment weight of the sentence.

3. The method as recited in claim 1, wherein calculating the event weight further comprises:
    extracting events from the sentence, wherein each event includes a verb or a verb and a noun; and
    calculating the event weight of the sentence as a sum of the word weights of the words in the extracted events.

4. The method as recited in claim 1, wherein calculating the entity weight further comprises:
    extracting entities from the sentence, wherein each entity includes a noun or an adjective and a noun; and
    calculating the entity weight of the sentence as a sum of the word weights of the words in the extracted entities.

5. The method as recited in claim 1, wherein calculating the sentiment weight further comprises:
    extracting sentiments from the sentence, wherein each sentiment includes an adjective; and
    calculating the sentiment weight of the sentence as a sum of the word weights of the words in the extracted sentiments.

6. The method as recited in claim I. wherein the assigning to each word the tag further comprises:
    utilizing a natural language processor to determine a part of speech to the word; and
    assigning the tag based on the determined part of speech.

7. The method as recited in claim I, wherein the identifying the word weight further comprises:
    identifying words in the corpus;
    stemming the words in the corpus;
    determining a frequency of occurrence in the corpus for each stemmed word; and
    assigning the word weight to the stemmed words based on the frequency of occurrence.

8. The method as recited in claim 1, wherein calculating the sentence weight for each sentence further comprises:
    calculating the position weight for the sentence as a maximum between a first constant and a second constant minus a position of the sentence within the paragraph times a third constant.

9. The method as recited in claim 8, wherein calculating the sentence weight for each sentence further comprises:
    calculating the sentence weight as the position weight times a weighted sum of the topic weight and the sum of the word weights of the words in the sentence.

10. A system comprising:
a memory comprising instructions; and
one or more computer processors, wherein the instructions, when executed by the one or more computer processors, cause the one or more computer processors to perform operations comprising:
  identifying a word weight for each word in a corpus based on a relevance of each word;
  receiving a document that comprises a plurality of sentences;
  assigning to each word in the plurality of sentences a tag indicative of a part of speech of the word;
  calculating a topic weight for each sentence based on the tags of the words in the sentence, wherein calculating the topic weight further comprises:
    calculating an event weight for the sentence based on the tags of the words in the sentence;
    calculating an entity weight for the sentence based on the tags of the words in the sentence; and
    calculating a sentiment weight for the sentence based on the tags of the words in the sentence;
  calculating a sentence weight for each sentence based on a sum of the word weights of the words in the sentence, the topic weight for the sentence, and a position weight of the sentence within a paragraph;
  selecting the sentence with a highest sentence weight as a title for the document; and
  causing the title to be presented with the document to a user.

11. The system as recited in claim 10, wherein calculating the topic weight further comprises:
  calculating the topic weight of the sentence as a weighted sum of the event weight, the entity weight, and the sentiment weight of the sentence.

12. A system comprising:
a memory comprising instructions; and
one or more computer processors, wherein the instructions, when executed by the one or more computer processors, cause the one or more computer processors to perform operations comprising:
  identifying a word weight for each word in a corpus based on a relevance of each word;
  receiving a document that comprises a plurality of sentences;
  assigning to each word in the plurality of sentences a tag indicative of a part of speech of the word;
  calculating a topic weight for each sentence based on the tags of the words in the sentence;
  calculating a sentence weight for each sentence based on a sum of the word weights of the words in the sentence the topic weight for the sentence, and a position weight of the sentence within a paragraph, wherein calculating the sentence weight for each sentence further comprises calculating the position weight for the sentence as a maximum between a first constant and a second constant minus a position of the sentence within the paragraph times a third constant;
  selecting, the sentence with a highest sentence weight as a title for the document; and
  causing the title to be presented with the document to a user.

13. The system as recited in claim 12, wherein calculating the sentence weight for each sentence further comprises:
  calculating the sentence weight as the position weight times a weighted sum of the topic weight and the sum of the word weights of the words in the sentence.

14. A non-transitory machine-readable storage medium including instructions that, when executed by a machine, cause the machine to perform operations comprising:
  identifying a word weight for each word in a corpus based on a relevance of each word;
  receiving a document that comprises a plurality of sentences;
  assigning to each word in the plurality of sentences a tag indicative of a part of speech of the word;
  calculating a topic weight for each sentence based on the tags of the words in the sentence, wherein calculating the topic weight further comprises:
    calculating an event weight for the sentence based on the tags of the words in the sentence;
    calculating an entity weight for the sentence based on the tags of the words in the sentence;
    calculating a sentiment weight for the sentence as on the tags of the words in the sentence; and
  calculating the topic weight of the sentence as a weighted SUM of the event weight, the entity weight, and the sentiment weight of the sentence;
  calculating a sentence weight for each sentence based on a sum of the word weights of the words in the sentence, the topic weight for the sentence, and a position weight of the sentence within a paragraph;
  selecting the sentence with a highest sentence weight as a title for the document; and
  causing the title to be presented with the document to a user.

15. The machine-readable storage medium as recited in claim 14, wherein calculating the event weight further comprises:
  extracting events from the sentence, wherein each event includes a verb or a verb and a noun; and
  calculating the event weight of the sentence as a sum of the word weights of the words in the extracted events.

16. The machine-readable storage medium as recited in claim 14, wherein calculating the entity weight further comprises:
  extracting entities from the sentence, wherein each entity includes a noun or an adjective and a noun; and
  calculating the entity weight of the sentence as a sum of the word weights of the words in the extracted entities.

17. The machine-readable storage medium as recited in claim 14, wherein calculating the sentiment weight further comprises:
  extracting sentiments from the sentence, wherein each sentiment includes an adjective; and
  calculating the sentiment weight of the sentence as a sum of the word weights of the words in the extracted sentiments.

* * * * *

UNITED STATES PATENT AND TRADEMARK OFFICE
CERTIFICATE OF CORRECTION

PATENT NO. : 9,946,703 B2  
APPLICATION NO. : 15/240965  
DATED : April 17, 2018  
INVENTOR(S) : Ma et al.

Page 1 of 1

It is certified that error appears in the above-identified patent and that said Letters Patent is hereby corrected as shown below:

In the Claims

In Column 22, Line 44, in Claim 6, delete "claim I." and insert --claim 1,-- therefor In Column 22, Line 49, in Claim 7, delete "claim I," and insert --claim 1,-- therefor In Column 23, Line 51, in Claim 12, after "sentence", insert --,--

In Column 23, Line 59, in Claim 12, delete "selecting," and insert --selecting-- therefor In Column 24, Line 25, in Claim 14, delete "as" and insert --based-- therefor In Column 24, Line 28, in Claim 14, delete "SUM" and insert --sum-- therefor Signed and Sealed this  
Eleventh Day of June, 2019

Andrei Iancu  
*Director of the United States Patent and Trademark Office*